(12) United States Patent
Zagaynov et al.

(10) Patent No.: US 12,718,611 B2
(45) Date of Patent: Aug. 25, 2026

(54) RELIABLE DETERMINATION OF FIELD VALUES IN DOCUMENTS WITH REMOVAL OF STATIC FIELD ELEMENTS

(71) Applicant: ABBYY Development Inc., Dover, DE (US)

(72) Inventors: Ivan Zagaynov, Dolgoprudniy (RU); Stanislav Semenov, Kommunarka (RU); Alena Dedigurova, Iskitim (RU)

(73) Assignee: ABBYY Development Inc., Dover, DE (US)

( * ) Notice: Subject to any disclaimer, the term of this patent is extended or adjusted under 35 U.S.C. 154(b) by 841 days.

(21) Appl. No.: 17/977,966

(22) Filed: Oct. 31, 2022

(65) Prior Publication Data

US 2024/0144711 A1 May 2, 2024

(51) Int. Cl.
*G06V 30/416* (2022.01)
*G06V 30/164* (2022.01)
*G06V 30/19* (2022.01)

(52) U.S. Cl.
CPC .......... *G06V 30/416* (2022.01); *G06V 30/164* (2022.01); *G06V 30/19147* (2022.01)

(58) Field of Classification Search
CPC ............... G06V 30/164; G06V 30/416; G06V 30/19147; G06V 10/82
See application file for complete search history.

(56) References Cited

U.S. PATENT DOCUMENTS 5,182,656 A 1/1993 Chevion
5,631,984 A 5/1997 Graf
6,507,671 B1 1/2003 Kagan
9,251,614 B1 2/2016 Tian
2020/0342221 A1* 10/2020 Sampath .............. G06V 30/412
2022/0092353 A1* 3/2022 Liu ........................ G06V 30/30
2023/0177821 A1* 6/2023 Peng .................... G06V 30/413 382/156
2023/0419117 A1* 12/2023 Specia ................... G06N 3/084

FOREIGN PATENT DOCUMENTS

CN 111340032 A 6/2020
EP 0658042 A1 6/1995

OTHER PUBLICATIONS

Nagarikar, et al. (Input Fields Recognition in Documents Using Deep Learning Techniques), pp. 4405-4415. (Year: 2021).*

(Continued)

*Primary Examiner* — Daniel G Mariam
(74) *Attorney, Agent, or Firm* — Lowenstein Sandler LLP

(57) ABSTRACT

Aspects and implementations provide for mechanisms of detection of fields in electronic documents and determination of values of the detected field. The disclosed techniques include obtaining an input into a machine learning model (MLM), the input including a first image of a field extracted from a document and depicting one or more static elements of the field and a field value, the input and further including a second image of the field. The input may be processed using the MLM to identify one or more static regions that correspond to static elements of the field. The identified static regions may be used to modify the first image in which the static regions are removed or have a reduced visibility. The modified image may be used to determine the field value.

20 Claims, 12 Drawing Sheets

(56) References Cited

OTHER PUBLICATIONS

Aldavert et al, "Automatic Static/Variable Content Separation in Administrative Document Images, "Computer Vision Center Dept. Ciencies de la Computaci ' o' Universitat Autonoma de Barcelona, 2017.

Murugeswari et al, "Complex Background and Foreground Extraction in Color Document Images using Interval Type-2 Fuzzy," International Journal of Computer Applications, vol. 25—No. 2, Jul. 2011.

* cited by examiner

RELIABLE DETERMINATION OF FIELD VALUES IN DOCUMENTS WITH REMOVAL OF STATIC FIELD ELEMENTS

TECHNICAL FIELD

The implementations of the disclosure relate generally to computer systems and, more specifically, to systems and methods for identifying fields in images of documents and determining values typed or written into the identified fields.

BACKGROUND

Detecting text fields in unstructured electronic documents is an important task in processing, storing, and referencing documents. Conventional approaches for field detection may involve the use of a large number of manually configurable heuristics and may thus require many human operations.

SUMMARY OF THE DISCLOSURE

Implementations of the present disclosure are directed to reliable determination of characters, numbers, symbols, or any other values typed, handwritten, or otherwise entered into fields in various forms and documents using machine learning techniques. The disclosed techniques are effective even in situations where entered field values overlap with field borders, symbol dividers, text annotations, and other static elements of the fields, and in situations where noise, blur, glare, poor lighting, and other imaging artefacts make determination of field values challenging for other existing techniques.

In one implementation, a method of the disclosure includes obtaining an input into a machine learning model (MLM), the input including a first image of a field, wherein the first image is extracted from a first document and depicts one or more static elements of the field and a first field value. The input may further include a second image of the field. The method further includes processing the input using the MLM to identify one or more static regions, wherein each of the one or more static regions corresponds to at least one of the one or more static elements of the field. The method further includes generating a modified first image of the field, wherein the modified first image depicts at least one of the one or more static regions with a reduced visibility compared with the first image. The method further includes determining the first field value using the modified first image.

In another implementation, a method of the disclosure obtaining a first training image of a field, wherein the first training image depicts one or more static elements of the field and a first field value. The method further includes obtaining one or more additional training images of the field and causing an MLM to concurrently process the first training image and the one or more additional training images to generate a training output that classifies at least some of a plurality of units of the first training image as one of at least: a unit associated with the one or more static elements of the field, or a unit associated with the first field value. The method further includes adjusting parameters of the MLM based on the training output.

In yet another implementation, a system of the disclosure includes a memory and a processing device communicatively coupled to the memory. The processing device is to obtain an input into an MLM, wherein the input includes a first image of a field, wherein the first image is extracted from a first document and depicts one or more static elements of the field and a first field value, and a second image of the field. The processing device is further to process the input using the MLM to identify one or more static regions, wherein each of the one or more static regions corresponds to at least one of the one or more static elements of the field. The processing device is further to generate a modified first image of the field, wherein the modified first image depicts at least one of the one or more static regions with a reduced visibility compared with the first image. The processing device is further to determine the first field value using the modified first image.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
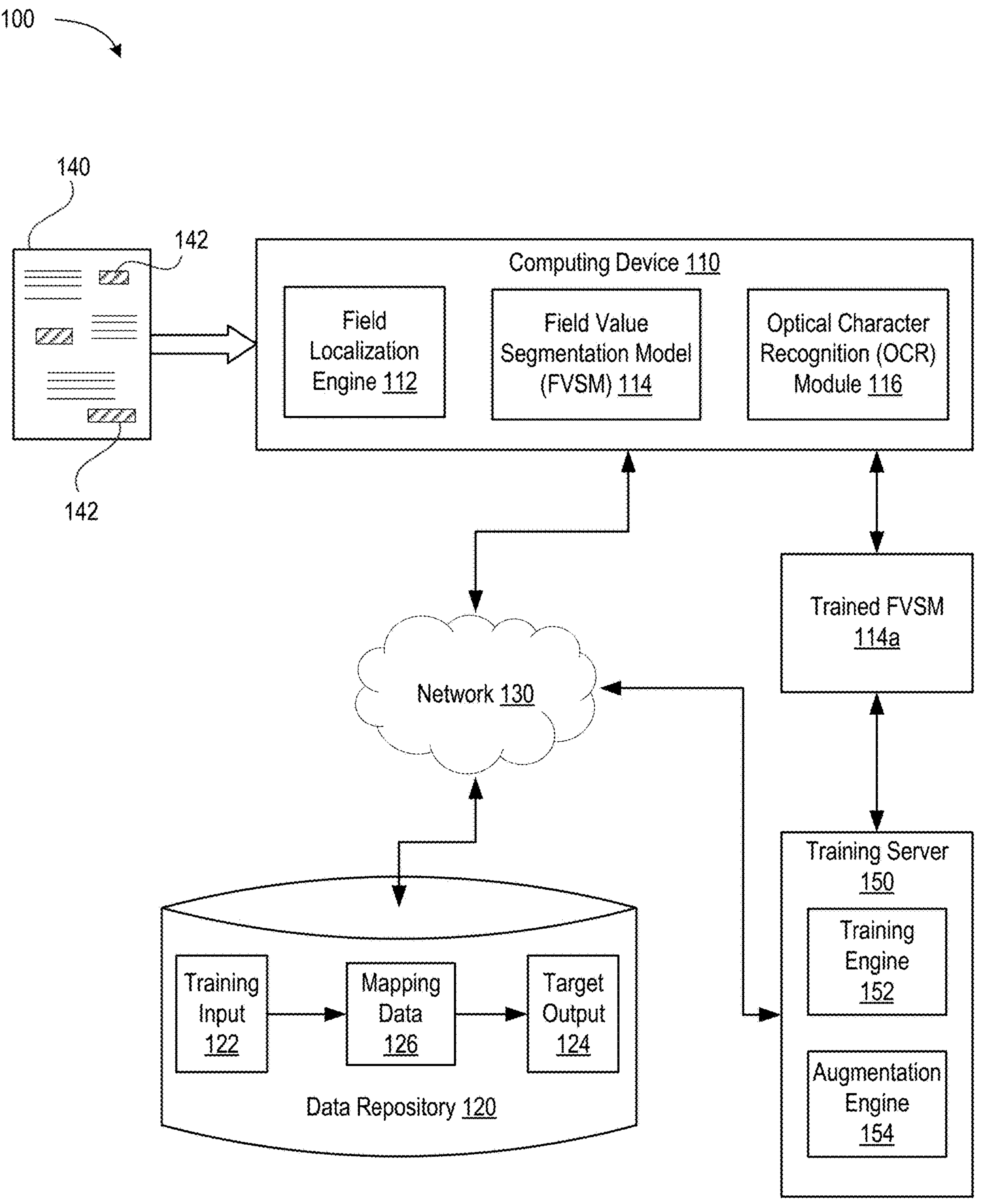
FIG. 1 is a block diagram of an example computer system in which implementations of the disclosure may operate, in accordance with some implementations of the present disclosure.

Fillable documents typically have one or more fields that are populated, e.g., by a person, a printer, or some other device, with letters, numbers, or any other alphanumeric strings or symbols, herein referred to as values of such fields. In structured electronic documents, e.g., forms that are filled out by customers, contractors, employees, record keepers, or any other users in digital form (e.g., on a computer, digital kiosk, or using some other digital interface), entered values may be automatically associated with correct fields. In many instances, however, information is entered into printed or other physical forms/documents or electronic unstructured documents (e.g., a scan of a form) using various writing or typing instruments, including pens, pencils, typewriters, printers, stamps, and the like, with filled out forms subsequently scanned or photographed to obtain an unstructured image of the form/document. In other instances, information is entered into unstructured electronic documents (e.g., a scan of a form) using a computer. The unstructured electronic documents may be stored, communicated, and eventually processed by a recipient computer to identify information contained in the documents, including determining values of various populated fields, e.g., using techniques of optical character recognition (OCR). Numerous field features and artifacts are normally present in images that obscure entered values of the fields and make precise determination of those values problematic. Such field features may include a boundary/frame of the field that may overlap with a portion of an entered value, various guiding lines and dividers, annotations with instructions how the field is to be populated, colored/shaded/patterned background, graphics elements (e.g., logos), and the like. Artifacts may include noise, marks on paper, defects of photography or scanning, such as lighting non-uniformity, spurious lines and dots, or any other imaging imperfections. Such field features and artifacts are collectively referred to as static (value-independent) elements although it should be understood that artifacts may vary from image to image.

Existing solutions that facilitate reliable identification of field values include various heuristic approaches. For example, a large number (e.g., hundreds) of documents, such as checks or invoices, are collected and statistics are accumulated about what text (e.g., keywords) is typically found within or near a particular field and how this text is likely to be placed relative to the field. The statistics can then be used to determine which regions of a new document (or which symbols recognized with OCR techniques) should be associated with a value of a specific field. The heuristic approaches, however, work better for fixed forms (in which fields have the same or approximately the same locations) and are often vendor-specific. This typically makes it necessary to develop a separate set of heuristics for multiple originators of forms, which results in long and expensive developmental efforts. In contrast, heuristic approaches have been much less successful in applications that involve flexible forms with varying, from form to form, locations and/or dimensions of fields.

Aspects of the present disclosure address the above noted and other challenges of the existing technology by providing for systems and techniques for reliable determination of field values in unstructured electronic documents of both fixed-form and flexible-form types using neural networks. In one implementation, disclosed is a system configured to process a batch of documents with similar fields. The system may perform initial localization of similar fields in the documents and segment (crop) the localized fields into smaller (cropped) images of those fields, herein referred to as field images (FIs) for brevity. In particular, in the instances of fixed-form documents where a document template is available, the initial localization and segmentation may be performed geometrically, by identifying and cropping images of fields based on the location of those fields in the template. In the instances of flexible-form documents, the initial localization may be performed across the batch of documents by identifying reference features in the documents and/or using various clustering techniques. The cropped FIs may then be processed by a machine learning model (MLM), e.g., a neural network (NN) trained to classify various regions (e.g., pixels or groups of pixels) of the FIs as corresponding to static elements, to field values, to neutral background, and the like.

More specifically, in the instances of fixed-form documents, a FI of a particular field may be received via a first input channel of the MLM, and a FI of the corresponding unpopulated field in the template may be received via a second input channel of the MLM. The MLM may process the received inputs using separate subnetworks (e.g., encoders) to generate feature vectors separately characterizing the FI of the document and the FI of the template before combining these feature vectors and processing the resulting combination via another subnetwork (e.g., a decoder). The output of the MLM may be a pixel map output by a pixel classifier and characterizing a likelihood that various pixels (groups of pixels) of the FI of the document belong to the field value or to one of the field's static elements.

In the instances of flexible-form documents, where a template is often not available, different input channels of a MLM may receive FIs of the same field cropped from multiple different documents. The number of input channels may be two, three, five, or any other number. In some implementations, the input into the MLM may be via a single channel with multiple FIs from different documents combined (e.g., concatenated) into a single input string which is then processed by an encoder subnetwork. Further processing of the flexible-form FIs may be performed similarly to the processing of fixed-form FIs as described above, e.g., using a decoder subnetwork and a pixel classifier. The MLM used for processing flexible-form documents may be separate (with different architecture and training) from the MLM used for processing fixed-form documents. In some implementations, a universal MLM may be trained having M input channels for FIs of various available templates and N input channels for FIs of filled documents. Some of the M+N input channels may be unused (e.g., may have zero inputs) in some instances. For example, if a template is available, some of the N input channels for filled documents may be unused (up to N−1 channels). The obtained map of pixel classifications may then be used to maintain pixels of field values and to remove pixels of static field elements, e.g., by decreasing intensity of pixels of static elements, increasing intensity of pixels of the field values, and applying one or more OCR algorithms to the pixels of field values.

Numerous additional implementations are disclosed herein. The advantages of the disclosed systems and techniques include but are not limited to efficient and reliable determination of field values in images of documents that is resilient against background noise and other image imperfections, natural variations in the manner in which the field values are entered into the forms, perspective distortions, folds and creases of the documents, and/or other field artifacts.

As used herein, a "document" or "form" may refer to any collection of symbols, such as words, letters, numbers, glyphs, punctuation marks, barcodes, pictures, logos, etc., that are printed, typed, handwritten, stamped, signed, drawn, painted, and the like, on a paper or any other physical or digital medium from which the symbols may be captured and/or stored in a digital image. A "document" or "form" may represent a financial document, a legal document, a government form, a shipping label, a purchasing order, an invoice, a credit application, a patent document, a contract, a bill of sale, a bill of lading, a receipt, an accounting document, a commercial or governmental report, or any other suitable document that may have one or more fields of interest. A "field" may refer to any region, portion, partition, table, table element, etc., of a document that may be assigned any dynamic (varying from document to document) field value by typing, writing, drawing, stamping, painting, copying, etc., of any symbol or a set of symbols within or near the field. A document/form may have multiple fields, e.g., a name field, an address field, a merchandize ordering field, a price field, an amount of goods field, a bank account field, a date field, an invoice number field, or any other type of a field. A document may be captured in any suitable scanned image, photographed image, or any other representation capable of being converted into a data form accessible to a computer. In accordance with various implementations of the present disclosure, an image may conform to any suitable electronic file format, such as PDF, DOC, ODT, JPEG, BMP, etc.

The techniques described herein may involve training neural networks to process images, e.g., to classify pixels and groups of pixels of various fields among multiple classes, e.g., a field-value class, a static-element class, a neutral background class, and so on. In some implementations, additional classes may be defined, e.g., a field boundary class, and so on. The neural network(s) may be trained using training datasets that include various templates (standard unfilled forms) and forms with at least some of the fields populated (filled) with field values. Training datasets may use real images and/or synthetic images, or any combination thereof, as described in more detail below. During training, a neural network may generate a training output for each training input. The training output of the neural network may be compared with a desired target output as specified by the training data set, and the error may be propagated back to the previous layers of the neural network, whose parameters (e.g., the weights and biases of the neurons) may be adjusted accordingly (e.g., using a suitable loss function) to optimize prediction accuracy. A trained neural network may be applied for efficient and reliable identification of fields and determination of the values of such fields in any suitable documents.

FIG. 1 is a block diagram of an example computer system 100 in which implementations of the disclosure may operate, in accordance with some implementations of the present disclosure. As illustrated, computer system 100 may include a computing device 110, a data repository 120, and a training server 150 connected to a network 130. Network 130 may be a public network (e.g., the Internet), a private network (e.g., a local area network (LAN) or wide area network (WAN)), or a combination thereof.

The computing device 110 may be a desktop computer, a laptop computer, a smartphone, a tablet computer, a server, a scanner, or any suitable computing device capable of performing the techniques described herein. In some implementations, the computing device 110 may be (and/or include) one or more computer systems 1200 of FIG. 12.

Computing device 110 may receive an image 140 that may also include any suitable text(s), graphics, table(s), and the like. Image 140 may be received in any suitable manner. For example, computing device 110 may receive a digital copy of image 140 by scanning or photographing a document, an object, a scenery, a view, and so on. Additionally, in those instances where computing device 110 is a server, a client device connected to the server via the network 130 may upload a digital copy of image 140 to the server. In the instances where computing device 110 is a client device connected to a server via the network 130, the client device may download image 140 from the server or from data repository 120.

Field localization engine 112 may identify the presence of one or more FIs 142 (illustrated as shaded rectangles) in image 140. Localization of FI(s) 142 may be accomplished by classifying various portions (e.g., groups of pixels) of image 140 as belonging to different classes, e.g., text, margins, headers, fillable fields, and the like. In some implementations, localization may be performed using a classifier trained using gradient boosting techniques. Field localization engine 112 may also apply clustering techniques, e.g., k-means clustering or similar algorithms, to group various portions classified as fields among one or more individual fields, e.g., name, address, goods purchased, price, etc. Field localization engine 112 may then crop the identified individual FI(s) 142 from image 140 to reduce computational cost of subsequent identification of field values in FI(s) 142. In some implementations, image 140 and/or cropped FI 142 may additionally be filtered, denoised, enhanced, normalized, rescaled, de-blurred, and the like.

Figure 2:
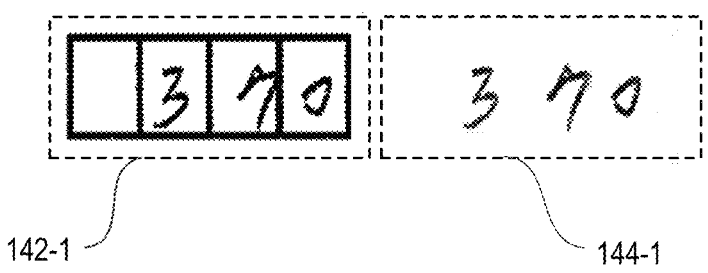
FIG. 2 illustrates static element removal from example images of fields, in accordance with some implementations of the present disclosure.
Figure 2:
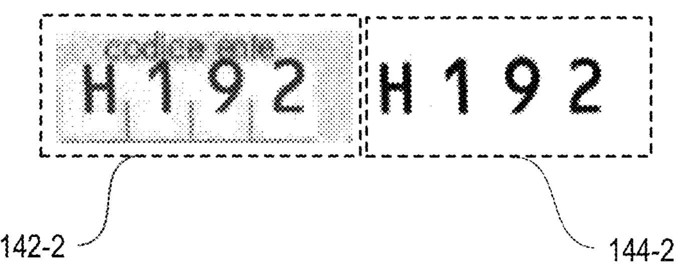
Figure 2:
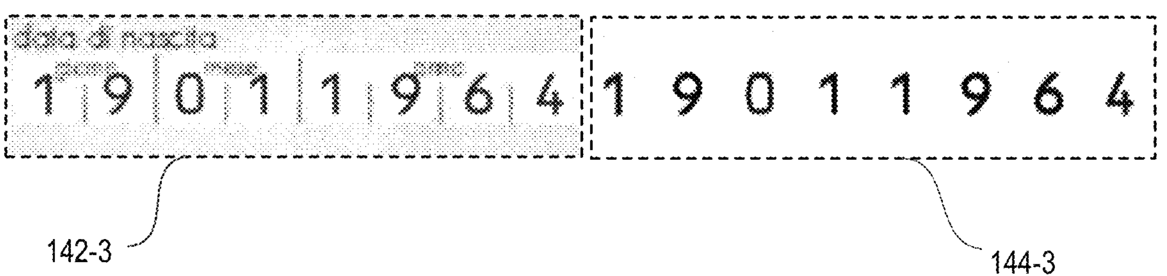
Figure 2:
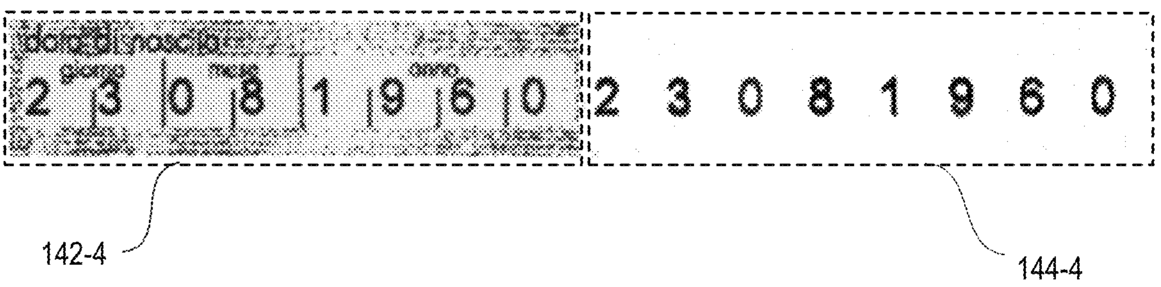

Segmentation may be performed by a field value segmentation model (FVSM) 114, which may include one or more trained neural networks. FVSM 114 may use, as inputs, FIs 142 cropped from image 140 together with additional FIs, which may be cropped from other documents (e.g., in the instances of flexible forms) or from template documents (e.g., in the instances of fixed forms), or both. FVSM 114 may output pixel classifications, e.g., binary classifications, between "field-value" class and "static-element" class. FIG. 2 illustrates static element removal from example FIs, in accordance with some implementations of the present disclosure. More specifically, the four example FIs in FIG. 2 illustrate FIs (solid boxes) 142-*n* and respective static element-free FIs 144-*n*. In particular, FI 142-1 includes boundaries of four symbol holders that are removed from static element-free FI 144-1, which depicts the field value "370" that is significantly more amenable to an accurate OCR processing than the original FI 141-1. Similarly, FI 142-2 includes placeholders, background, and an annotation "codice ente" absent in static element-free FI 144-2; FI 142-3 includes placeholders, background, and multiple annotations "data di nascita" "giorno" "mese" "anno" absent in static element-free FI 144-3; and FI 142-4 includes static elements that are similar to FI 144-3 with a denser background, which are removed from static element-free FI 144-4. With a continuing reference to FIG. 1, pixels of static element-free FIs 144-*n* classified as value pixels (with static element pixels removed) may then be processed by OCR module 116 to determine accurate field values.

Field localization engine 112, FVSM114, and OCR module 116 may include (or may have access to) instructions stored on one or more tangible, machine-readable storage media of computing device 110 and executable by one or more processing devices of computing device 110. In one implementation, field localization engine 112, FVSM 114, and OCR module 116 may be implemented as a single component. Field localization engine 112, FVSM 114, and OCR module 116 may each be a client-based application or may be a combination of a client component and a server component. In some implementations, field localization engine 112, FVSM 114, and OCR module 116 may be executed entirely on the client computing device such as a server computer, a desktop computer, a tablet computer, a smart phone, a notebook computer, a camera, a video camera, or the like. Alternatively, some portion of field localization engine 112, FVSM 114, and OCR module 116 may be executed on a client computing device (which may receive image 140) while another portion of field localization engine 112, FVSM 114, and OCR module 116 may be executed on a server device that performs ultimate determination of field values. The server portion may then communicate the field values to the client computing device, for further usage and/or storage. Alternatively, the server portion may provide the field values to another application. In other implementations, field localization engine 112, FVSM 114, and OCR module 116 may execute on a server device as an Internet-enabled application accessible via a browser interface. The server device may be represented by one or more computer systems such as one or more server machines, workstations, mainframe machines, personal computers (PCs), etc.

A training server 150 may construct FVSM 114*a* (or other machine learning models) and train one or more FVSMs 114*a* to perform segmentation of various pixels (or other regions) of FIs among two or more classes, with at least one class corresponding to field static elements that are to be removed. Training server 150 may include a training engine 152 that performs training of FVSM(s) 114*a*. Training server 150 may be and/or include a rackmount server, a router computer, a personal computer, a portable digital assistant, a mobile phone, a laptop computer, a tablet computer, a camera, a video camera, a netbook, a desktop computer, a media center, or any combination of the above. FVSM(s) 114*a* may be trained to segment FI(s) 142 into static-element pixels and field-value pixels.

During training of FVSM(s) 114*a*, image(s) 140 may be appropriately prepared. For instance, FI(s) 142 may be manually or automatically annotated. More specifically, training engine 152 may operate in combination with an augmentation engine 154. A developer may have access to one or more base FIs or template FIs. A training FI 142 may be then obtained by augmenting a base FI with a field value and one or more imperfections. Specifically, in one implementation, a training server 150 may include an augmentation engine 154 that can be used to add various static elements to a base FI, such as boundaries, background shading, simulated watermarks, smudges, deformations, perspective distortions, defocusing static elements, excessive (glare) or reduced lighting, reduced contrast, and the like. Augmentation engine 154 may then provide the modified FIs (as training data) to data repository 120 where it can be accessed by training engine 152.

FVSM(s) 114*a* may be trained by the training engine 152 using training data (e.g., synthetic augmented FIs) that include training inputs 122 and corresponding target outputs 124 (correct classifications for the respective training inputs 122). The training engine 152 may find patterns in the training data that map the training inputs to the target outputs (the desired result to be predicted), and train FVSM(s) 114*a* to capture these patterns. As described in more detail below, FVSM(s) 114*a* may include deep neural networks, with one or more hidden layers, e.g., convolutional neural networks, recurrent neural networks (RNN), and fully connected neural networks. The training data may be stored in data repository 120 and may also include mapping data 126 that maps training inputs 122 to target outputs 124. Target outputs 124 may include ground truth that include pixel-by-pixel classifications, which may include pixel annotation of various pixels of training FIs added by augmentation engine 154, e.g., with pixels of field values assigned annotation bit value 1 and other pixels (e.g., pixels of static elements, of the neutral background, etc.) assigned annotation bit value 0. During the training phase, training engine 152 may find patterns in the training data that can be used to map the training inputs to the target outputs. The patterns can be subsequently used by FVSM(s) 114*a* for future predictions (inferences, detections).

Data repository 120 may be a persistent storage capable of storing files as well as data structures to perform determination of field values in electronic documents, in accordance with implementations of the present disclosure. Data repository 120 be hosted by one or more storage devices, such as main memory, magnetic or optical storage disks, tapes, or hard drives, network-attached storage (NAS), storage area network (SAN), and so forth. Although depicted as separate from the computing device 110, data repository 120 may be part of computing device 110. In some implementations, data repository 120 may be a network-attached file server, while in other implementations data repository 120 may be some other type of persistent storage such as an object-oriented database, a relational database, and so forth, that may be hosted by a server machine or one or more different machines coupled to the via the network 130.

In some implementations, training engine 152 may train FVSM(s) 114*a* that include multiple neurons to perform field value segmentation, in accordance with some implementations of the present disclosure. Each neuron may receive its input from other neurons or from an external source and may produce an output by applying an activation function to the sum of weighted inputs and a trainable bias value. A neural network may include multiple neurons arranged in layers, including an input layer, one or more hidden layers, and an output layer. Neurons from different layers may be connected by weighted edges. The edge weights are defined at the network training stage based on a training dataset that includes a plurality of images with known fields and field values. In one illustrative example, all the edge weights may be initially assigned some random values. For every training input 122 in the training dataset, training engine 152 may compare observed output of the neural network with the target output 124 specified by the training data set. The resulting error, e.g., the difference between the output of the neural network and the target output, may be propagated back through the layers of the neural network, and the weights and biases may be adjusted in the way that makes observed outputs closer to target outputs 124. This adjustment may be repeated until the error for a particular training input 122 satisfies a predetermined condition (e.g., falls below a predetermined error). Subsequently, a different training input 122 may be selected, a new output may be generated, and a new series of adjustments may be implemented, and so on, until the neural network is trained to a sufficient degree of accuracy. In some implementations, this training method may be applied to training one or more artificial neural networks illustrated in FIG. 4, FIG. 7, and FIG. 8.

After FVSM(s) 114*a* are trained, the set of FVSM(s) 114*a* may be provided to computing device 110 for inference analysis of new documents. For example, computing device 110 may process a new image 140 using the provided FVSM(s) 114*a*, remove static field elements, and extract field values stored in various fields of the new document.

Figure 3:
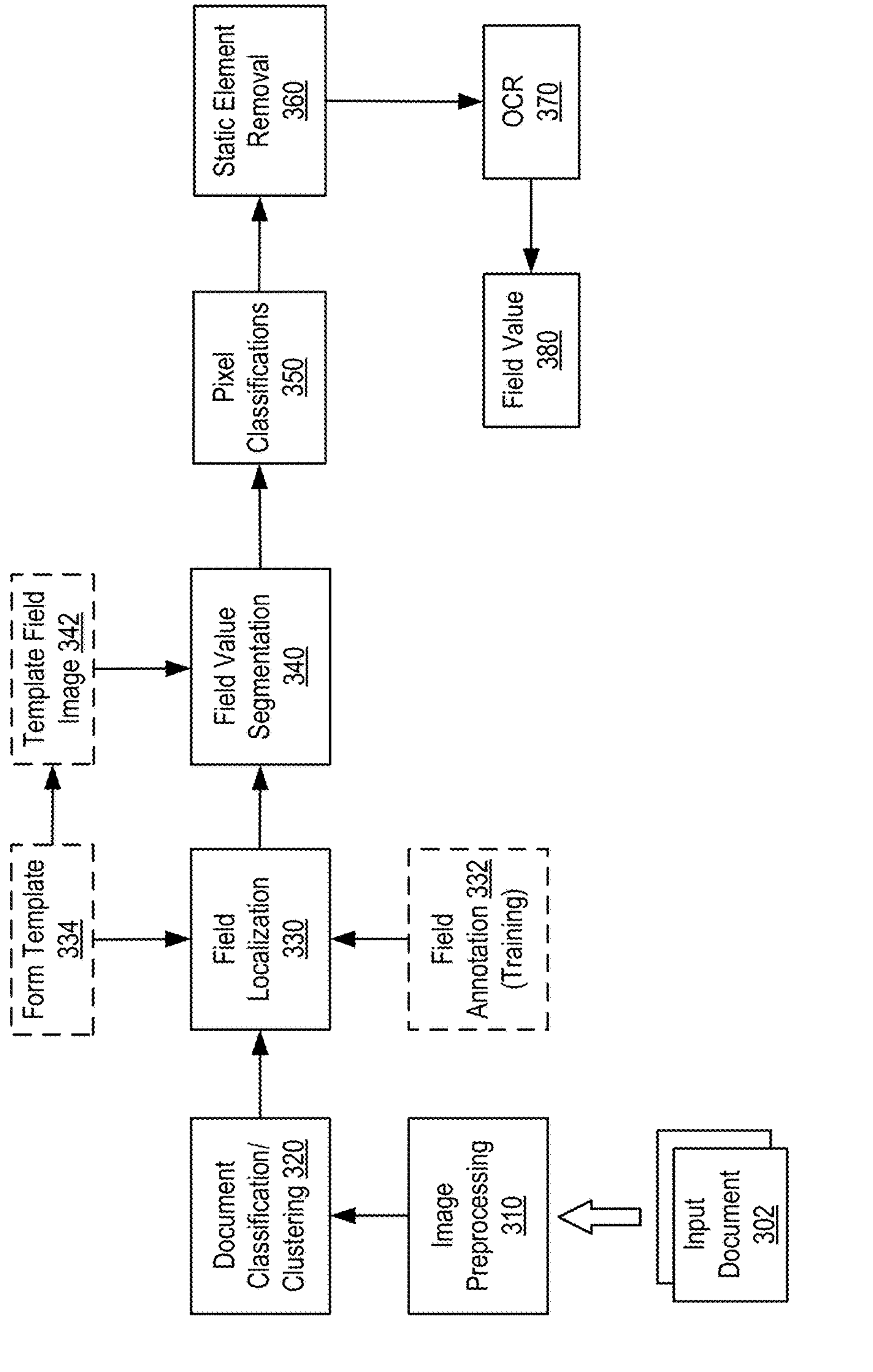
FIG. 3 illustrates example operations of reliable determination of field values in electronic documents using static field element segmentation, in accordance with some implementations of the present disclosure.

FIG. 3 illustrates example operations 300 of reliable determination of field values in electronic documents using static field element segmentation, in accordance with some implementations of the present disclosure. In some implementations, example operations 300 may be performed using example computer system 100 of FIG. 1. Input document(s) 302 may be images of any single-page or multi-page document(s) with depictions of one or more fields populated with field values that are typed, handwritten, drawn, stamped, or filled in any other manner. Input document(s) 302 may undergo image preprocessing 310, which may include enhancing the quality of input document(s) 302, including de-blurring, filtering, sharpening, de-noising, changing dimensions, rotating or re-aligning, and the like. In some implementations, image preprocessing 310 may include OCR processing of input document(s) 302 to recognize various symbols, letters, words, text strings, numerals, and strings of numerals, and the like.

Image preprocessing 310 may be followed by document classification/clustering 320 that classifies input documents 302 among a number of types, e.g., "invoice," "purchasing order," "passport application," "real estate purchase agreement," "questionnaire," "credit application form," etc. Classifying documents may be performed using any suitable classification algorithms, e.g., gradient boosting algorithms. In some implementations, document classification/clustering 320 may distribute input documents 302 among a number of clusters. For example, input documents 302 classified as the invoice type may be further distributed among clusters corresponding to different vendors and/or different invoice layouts. More specifically, clustering of input documents 302 may be performed by identifying a number of reference points or features common to various documents of a particular type (e.g., word "price" may be common to documents of the invoice type) and clustering the documents with respect to different arrangements of such reference points/features within a given document. In some implementations, clustering of documents may be performed using neural networks, e.g., as disclosed in U.S. patent application Ser. No. 17/397,440 "Document clusterization using neural networks," which is incorporated in its entirety herein.

Document classification/clustering 320 groups similar-looking documents into clusters that may be processed together. Field localization stage 330, e.g., performed by field localization engine 112 of FIG. 1, may be implemented differently during the training stage and during the inference stage of system operations. More specifically, during the training stage, a developer may perform field annotation 332 for one or more documents in each cluster. Annotations teach the system to identify target fields of interest in the documents. Any number of different target fields may be annotated for a given type/cluster of documents. Annotation may be performed in any suitable way by identifying regions (e.g., marking with a bounding box) in the documents corresponding to each field $\text{Field}_1$, $\text{Field}_2$, . . . , $\text{Field}_M$ of interest (e.g., name, date, price, etc.). In the instances of fixed forms, one document in each cluster may be annotated. For example, a form template 334, e.g., a clean form devoid of field values, may be annotated. Subsequently, during processing of new documents (both during the training stage and the inference stage), field localization stage 330 may include superimposing developer's field annotations on new documents and cropping the regions corresponding to the field annotations in those documents to obtain FIs of the fields of interest. In some implementations, field localization stage 330 may include additional filtering, de-noising, background smoothing, and other processing of the cropped FIs.

In the instances of flexible forms, annotation of more than one document may facilitate more robust identification of fields, although in some instances a single document may be annotated for each cluster. In some implementations, in order to train the system to locate the fields of interest more efficiently and accurately, annotating multiple documents with different locations of the fields of interest (and, if available, with different appearances of these fields) may be performed.

Annotated documents may be used to train field localization stage 330, which may include various algorithms and mechanisms of finding reference elements, such as using reference (key) points (e.g., corners or edges of the field borders), reference words (e.g., titles of the fields), reference graphics elements (e.g., a visual divider, a change of background colors, a logo), or any other representative structural elements in the documents. Reference elements may be identified by matching words from a custom dictionary, e.g., a corpus of words of the documents of the pertinent type, e.g., words appearing with at least a predefined threshold frequency. In some implementations, field localization stage 330 may localize fields by identifying spatial distributions of pixels of FIs and surrounding areas in relation to the reference elements. During the training stage, a heat map may be generated for various reference elements. "Heat map" refers to any set of values associated with a location of a particular reference element, e.g., a matrix whose elements are associated with pixels in a vicinity of the reference element. In some implementations, these matrix elements may correspond to a number of training documents in which the FI (or its surroundings) contains a respective pixel. The heat maps identified during the training phase may subsequently be used by field localization stage 330 in the inference phase to identify to locate FIs in new input documents 302 based on the heat maps. In some implementations, various additional techniques of FI localization may be used, e.g., as disclosed in U.S. patent application Ser. No. 17/129,906 "Methods and systems of field detection in a document," which is incorporated in its entirety herein.

Fields identified by field localization stage 330 may be cropped from input documents 302 to generate FIs. Individual FIs may include depictions of the corresponding fields of interest. Each FI may include the corresponding fields and some additional surrounding area, to account for instances in which a field value is entered (e.g., written or typed) in a way that extends beyond the nominal boundaries of the field, overlap with guiding elements of the field, skip some parts of the field, depict a value entered using incorrect partitions of the field, and the like. Examples of cropped FIs are illustrated in FIG. 2, e.g., FIs 142-1 . . . 142-4. Static elements present in FIs, which are output by field localization stage 330, may make problematic direct application of OCR to FIs and result in a low accuracy of determination of values of the depicted fields. On the other hand, even in the instances of fixed forms with available templates, direct pixel-by-pixel correspondence may be inaccurate for identifying static element pixels, since FIs may include distortions, zoom artifacts, document-to-document variations in positioning of the field in the document and the template document. For these and other reasons, a significant improvement of accuracy and reliability of field value determination may be achieved by neural network-based field value segmentation 340, which may use one or more trained FVSMs 114 of FIG. 1.

In some implementations, field value segmentation 340 may be performed differently for fixed-form documents and for flexible-form documents, e.g., using separately trained FVSMs 114. For example, in the instances of fixed forms, field value segmentation 340 may include processing a given cropped FI together with the image of the corresponding field (template FI 342) cropped from form template 334. In some implementations, template FI 342 may be an image of a clean (unfilled) field. In some implementations, template FI 342 may be an image of a filled field. In the instances of flexible forms, field value segmentation 340 may include processing a cropped FI together with one or more N−1 additional images of the corresponding field cropped from other documents. More specifically, during the training stage, such additional FIs may be images cropped from training documents. During the inference stage, such additional FIs may be images of other documents in which field values are to be determined, e.g., a batch of new receipts for which the values of fields "vendor", "price," and "date" are to be determined. In some instances (e.g., where a single new document is being processed), some images in the batch of additional images may be previously processed field images or images that were used in training.

In some implementations, field value segmentation 340 may be performed jointly for fixed forms and for flexible forms, e.g., using a unified trained FVSMs 114 (as described in conjunction with FIG. 8 below). For example, a unified FVSM may use, as inputs, (1) a target FI from a given document whose segmentation is being performed, (2) up to M template FIs cropped from different images of various form templates 334, and (3) up to N−1 additional images of the corresponding field cropped from other documents. Additional details of possible FVSM architecture is illustrated below in conjunction with FIGS. 4 and FIGS. 7-8.

The output of field value segmentation 340 may include pixel classifications 350, which may assign, to each input pixel with coordinates x and y and characterized by a set of intensities (e.g., RGB intensities, CMYK intensities, or black-and-white intensity) $\{I_1 \ldots I_n\}(x, y)$, a pixel classification C, e.g., $\{I_1 \ldots I_n; C\}(x, y)$, with C=1 pixels corresponding to field values and C=0 pixels corresponding to static elements, background, and so on. Subsequently, static element removal 360 may keep intensities of pixels $\{I_1 \ldots I_n; C=1\}(x, y)$ unchanged and set intensities of pixels $\{I_1 \ldots I_n; C=0\}(x, y)$ to some nominal intensities corresponding to a background color, e.g., a white background. After removal of static element pixels, operations 300 may continue with OCR 370 that determines a field value 380 of a respective field. Operations of blocks 340-370 may be performed for each FI of an input document to identify field values of all target fields in the input document.

Figure 4:
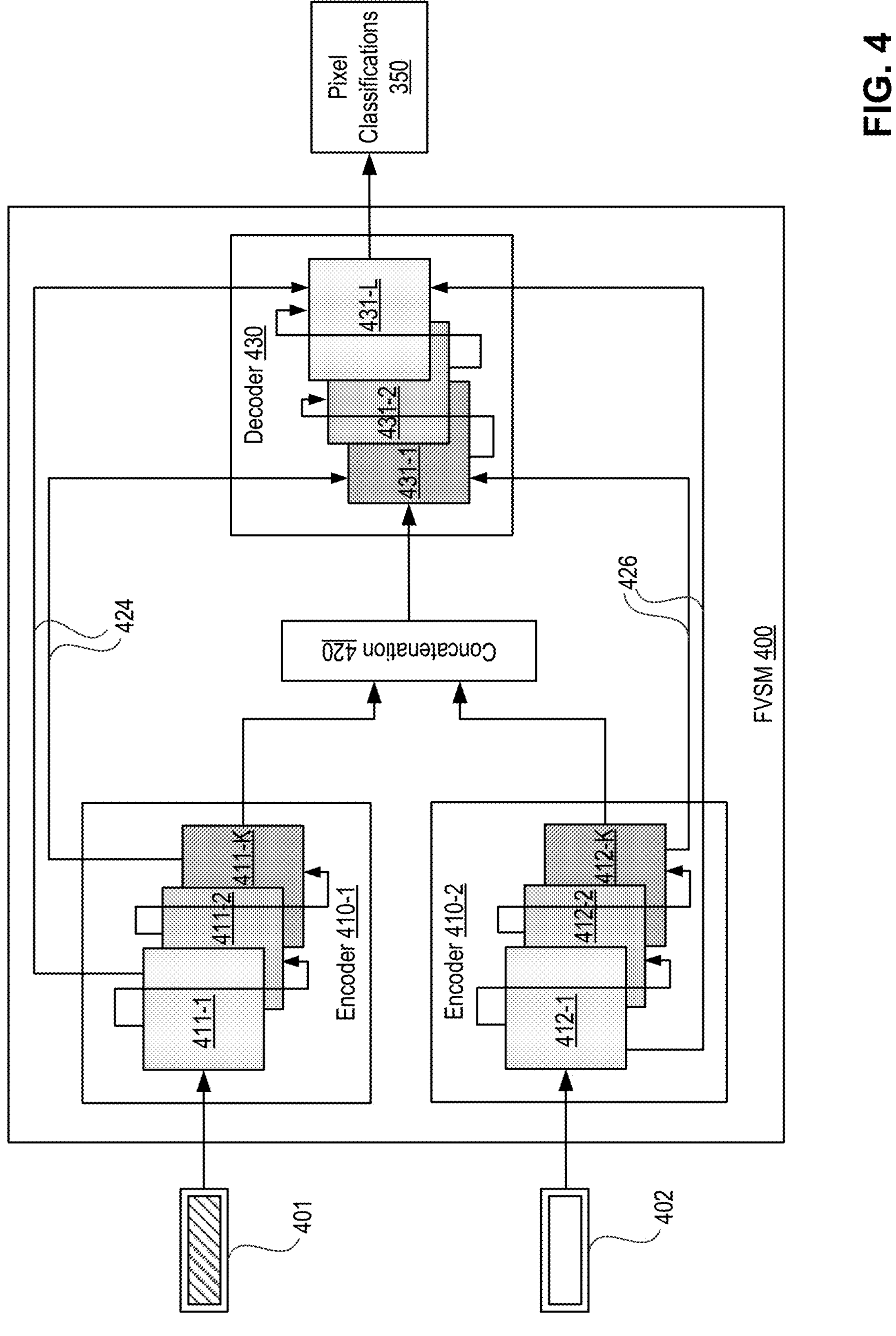
FIG. 4 illustrates an example architecture of a field value segmentation model capable of identifying static elements in field images during determination of field values in fixed-form electronic documents, in accordance with some implementations of the present disclosure.
Figure 5A:
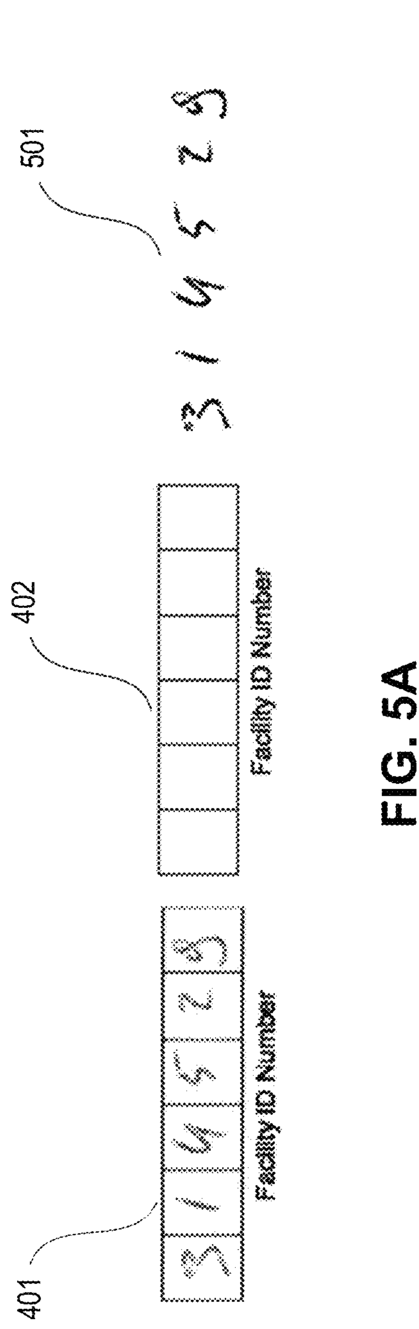
FIG. 5A illustrates example images of fields that may be used as inputs into the field value segmentation model of FIG. 4.

FIG. 4 illustrates an example architecture of a field value segmentation model 400 capable of identifying static elements in field images during determination of field values in fixed-form electronic documents, in accordance with some implementations of the present disclosure. In some implementations, FVSM 400 may be FVSM 114 of FIG. 1 and may perform field value segmentation 340 during operations 300 of FIG. 3. FVSM 400 may receive, as an input into a first channel, a FI 401 depicting a field that has been cropped from any suitable training, validation, or inference document, e.g., as disclosed in conjunction with field localization stage 330 of FIG. 3. As an input into a second channel, FVSM 400 may receive a FI 402 depicting a field that has been cropped from a fixed-form template (or a synthetic template). FIG. 5A illustrates example FIs 401 and 402 that may be used as inputs into field value segmentation model 400 of FIG. 4. As illustrated, FI 401 depicts a populated field and captures a frame, symbol dividers, a field annotation ("Facility ID Number"), and a field value ("314529"). Similarly, FI 402 captures (e.g., from a form template) the frame, the dividers, and the field annotation ("Facility ID Number") but is devoid of the field value.

With a continuing reference to FIG. 4, in some non-limiting implementations, FVSM 400 may include separate encoder subnetworks (referred to, for simplicity, as encoders herein) that process separate input channels, e.g., encoder 410-1 may process FI 401 and encoder 410-2 may process FI 402. Each encoder **410-*n* may have one or more encoder blocks, e.g., encoder 410-1 may include encoder blocks 411-1, 411-2 . . . 411-K and encoder 410-2 may include encoder blocks 412-1, 412-2 . . . 412-K. Outputs of different encoders 410-*n* may be concatenated (or otherwise combined) at concatenation stage 420. Further processing of concatenated outputs of encoders 410-*n* may be performed using a decoder subnetwork (referred to, for simplicity, as decoder herein). Decoder 430 may include one or more decoder blocks, e.g., decoder blocks 431-1, 431-2 . . . 431**-L. In some implementations, the number L of decoder blocks may be the same as the number K of encoder blocks, e.g., one, two, three, four, five, six, or more. In some implementations, the number L of decoder blocks may be different from the number K of encoder blocks. The number L of decoder blocks and/or the number K of encoder blocks may be determined empirically, e.g., based on the complexity of specific tasks and/or quality of typical FIs that the FVSM is expected to process. For example, for processing of FIs of a relatively good quality, a lower number (e.g., two or three) of encoder/decoder blocks may be deployed whereas for processing of FIs of a poor quality, a higher number (e.g., five or six) of encoder/decoder blocks may be used.

In some implementations, FVSM 400 may have a U-net (or similar) structure where each subsequent encoder block **411-*n* (and/or 412-*n*) generates features of a progressively larger scale (thus capturing progressively broader context of various regions of the FIs being processed) while each decoder block 431-*n* generates feature vectors of progressively more detailed resolution that retain awareness of larger regions of the FIs. In some implementations, additional imaging context may be provided via skipped connections 424 and 426 that extend from at least some of the encoder blocks to some of the decoder blocks. Although the skipped connections are shown between the highest resolution encoder blocks 411-1 and 412-1 and the highest resolution decoder block 431-L and between the lowest resolution encoder blocks 411-K and 412-K and the lowest resolution decoder block 431-1, any number of various encoder blocks 411-*n* (and/or 412-*n*) may have skipped connections to any number of decoder blocks 431-*n*. Numerous arrangements of skipped connections may be implemented in FVSM 400. For example, skipped connections between lower resolution blocks may be between each of encoders 410-1 and 410-2 and decoder 430 whereas skipped connections between higher resolution blocks may be between one of the encoders (e.g., encoder 410-1) and decoder 430. Skipped connections provide partially encoded features of a particular scale to the decoding stage of the same (or different scale) to combine the features that maintain strong awareness of local regions of the FI (encoder features) with the features that have acquired more awareness of the broader regions of the FI. In some implementations, skipped connections 424 and/or 426 may include one or more dilated convolutional layers with exponentially increasing size of the receptive field (not shown in FIG. 4**).

Figures 6A, 6B:
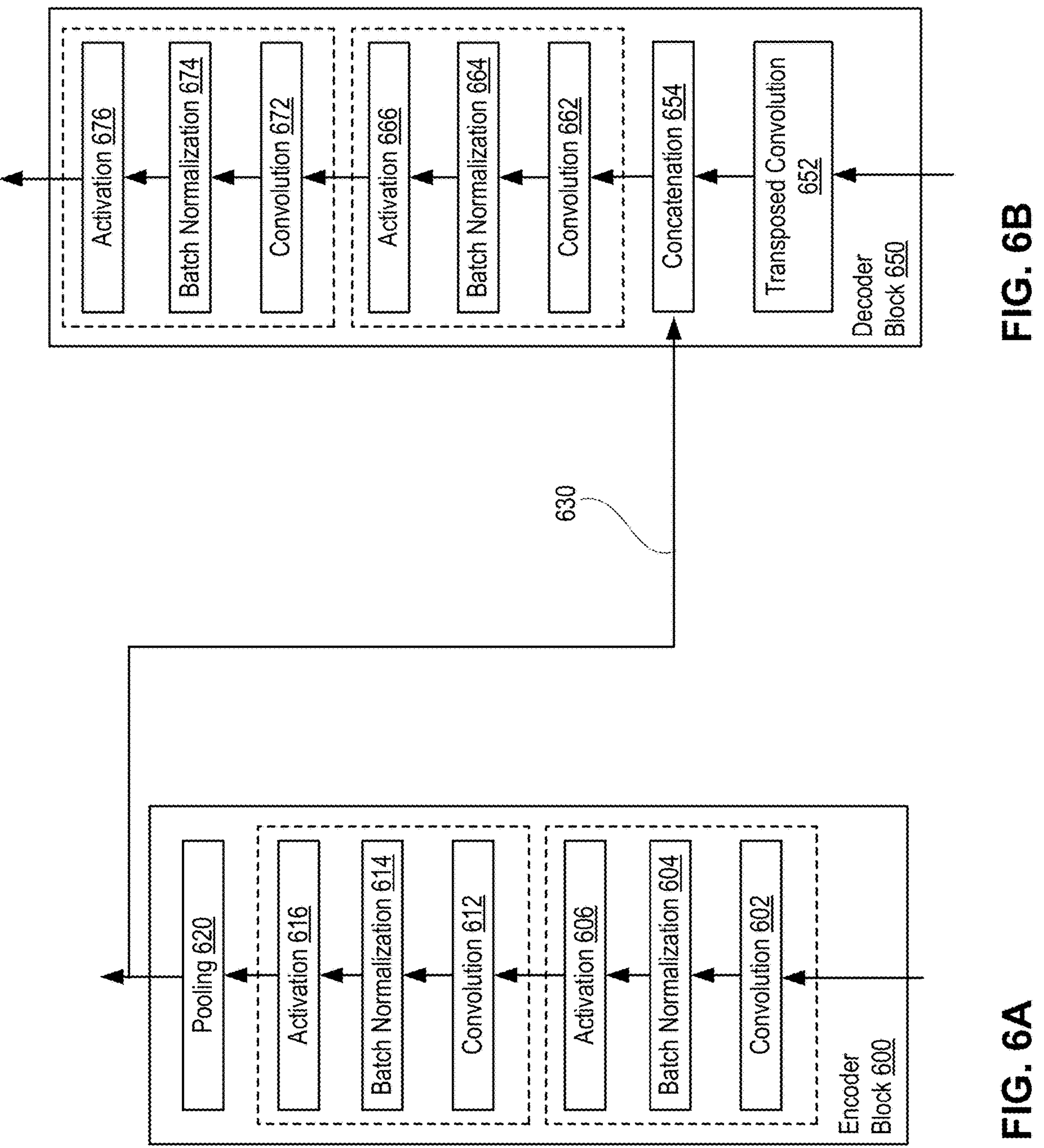
FIGS. 6A-B illustrate example architecture of an encoder block and a decoder block that may be deployed as part of a field value segmentation model, in accordance with some implementations of the present disclosure.

FIGS. 6A-B illustrate example architecture of an encoder block 600 and a decoder block 650 that may be deployed as part of a field value segmentation model (e.g., FVSM 400 of FIG. 4), in accordance with some implementations of the present disclosure. More specifically, encoder block 600 illustrated in FIG. 6A may be any of encoder blocks 411-*n* or 412-*n* and may include one or more repeated convolution layers 602 and 612, batch normalization layers 604, 614 and activation layers 606, 616. Although two sets of layers (602-606 and 612-616) are shown in FIG. 6A, any other number (e.g., one, three, four, etc.) of the sets of layers may be included in each encoder block 600. Each convolution layer 602, 612 may use a 3×3 kernel (filter), a 5×5 kernel, or a kernel of any other dimensions, and a suitable stride, e.g., 1, 2, 3, or some other value. Each activation layer 606, 616 may include a suitable activation function, e.g., a rectified linear unit (ReLU) function. Encoder block 600 may include a pooling layer 620, which may be a maximum pooling layer or an average pooling layer. In some implementations, pooling layer 620 may use a kernel with dimensions 2×2 and stride 2. In some implementations, pooling layer 620 may be replaced with another convolution layer with a 2×2 kernel and stride 2, or some other kernel/stride, e.g., 4×4 kernel and stride 4.

The output of encoder block 600 may be fed into another encoder block or into a decoder block 650. A skipped connection 630 may deliver a copy of the output of encoder block 600 to one of the decoder blocks.

Decoder block 650 illustrated in FIG. 6B may be any of decoder blocks 431-*n* and may include one or more transposed convolution layers 652 and a concatenation stage 654 that concatenates the output of transposed convolution layer 652 with intermediate encoder features delivered over skipped connection 630. Decoder block 650 may further include one or more repeated convolution layers 662, 672, batch normalization layers 664, 674, and activation layers 666, 676. Although two sets of layers (662-666 and 672-676) are shown in FIG. 6B, any other number (e.g., one, three, four, etc.) of the sets of layers may be included in each decoder block 650. Each convolutional layer 662, 672 may use a 3×3 kernel, a 5×5 kernel, or a kernel of any other dimensions, and a suitable stride, e.g., 1, 2, 3, or some other value. Each activation layer 666, 676 may include a suitable activation function, e.g., a rectified linear unit (ReLU) function.

It should be understood that numerous modifications of encoder block 600 and decoder block 650 may be used in various implementations. For example, encoder block 600 and/or decoder block 650 may include one or more attention blocks. In some implementations, encoder block 600 and/or decoder block 650 may include one or more Squeeze-and-Excitation blocks.

With a continuing reference to FIG. 4, the output of decoder 430 may include pixel classifications 350. More specifically, an activation layer of the last decoder block 431-L may be a sigmoid classification layer that outputs the probabilities $p \in [0,1]$ that each pixel (or a group of pixels) of FI 401 belongs to the corresponding field value, with the probability that the respective pixel belongs to a static element or a background being $1-p$. An empirically selected threshold $p_0$ (e.g., $p_0=0.5$ or some other value) may then be used for obtained final pixel classifications, e.g., with pixels (or groups of pixels) having $p \geq p_0$ classified as pixels of the field value and pixels having $p<p_0$ classified as static element pixels or background pixels. FIG. 5A depicts a static element-free FI 501 in which only pixels classified as field value pixels have been maintained (e.g., based on processing of FI 401 and FI 402 by FVSM 400).

Figure 7:
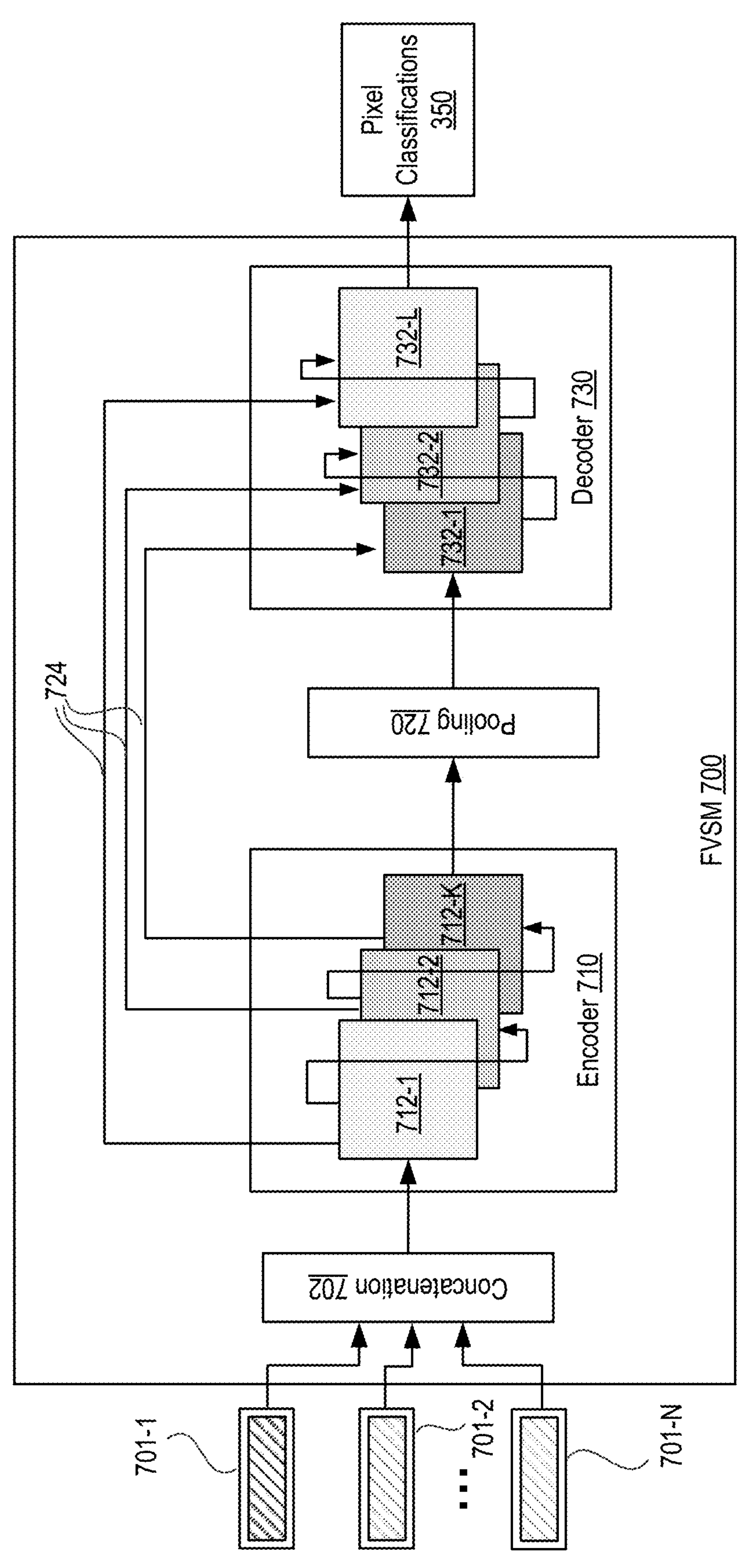
FIG. 7 illustrates an example architecture of a field value segmentation model capable of identifying static elements in field images during determination of field values in flexible-form electronic documents, in accordance with some implementations of the present disclosure.

FIG. 7 illustrates an example architecture of a field value segmentation model 700 capable of identifying static elements in field images during determination of field values in flexible-form electronic documents, in accordance with some implementations of the present disclosure. In some implementations, FVSM 700 may be FVSM 114 of FIG. 1 and may perform field value segmentation 340 in the course of operations 300 of FIG. 3. FVSM 700 may have N input channels and may receive, as an input into a first channel, a FI 701-1 of a field that has been cropped from a target document. FI 701-1 may depict a field whose field value is to be determined. As inputs into additional N−1 channels, FVSM 700 may receive FI 701-2 . . . FI 701-N, respectively, image fields of the same type from other documents. For example, FIs 701-2 . . . 701-N may be cropped from documents in the same batch of new documents received for inference processing. In such cases, N instances of FVSM 700 processing may be performed, with a different FI being input into the first channel in each instance. In those cases where a single new document has been received for inference, FI 701-1 may be cropped from the new document whereas FIs 701-2 . . . 701-N may be cropped from documents processed previously or documents used during the training stage. Any of FIs 701-1 . . . 701-N may be generated as described in conjunction with field localization stage 330 of FIG. 3 above.

Figure 5B:
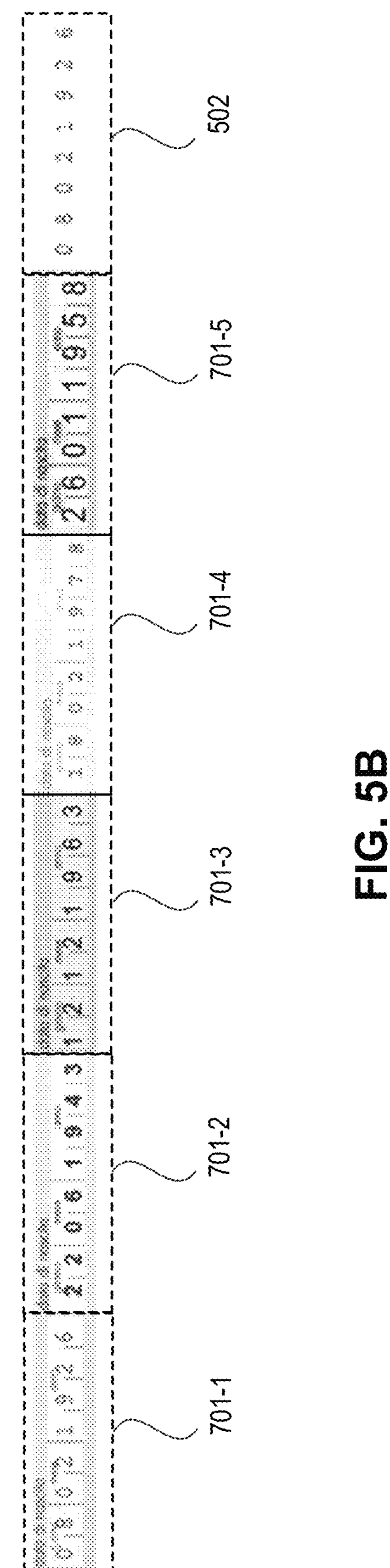
FIG. 5B illustrates example images of fields that may be used as inputs into the field value segmentation model FIG. 7.

FIG. 5B illustrates example FIs 701-1 . . . 701-N that may be used as inputs into field value segmentation model 700 of FIG. 7. As illustrated, any of FIs 701-1 . . . 701-N cropped from different documents may include pixels of background, symbol dividers, annotations, and any other static elements. With a continuing reference to FIG. 7, in some non-limiting implementations, FVSM 700 may include an encoder 710 that processes FIs 701-1 . . . 701-N concatenated (or otherwise combined) at concatenation block 702. In some implementations, encoder 710 may have one or more encoder blocks 712-1, 712-2 . . . 712-K whose architecture and operations may be similar to architecture and operations of the encoder blocks described in conjunction with FIG. 4 and FIG. 6A. Output of encoder 710 may be processed by a pooling layer 720, e.g., a maximum pooling layer or an average pooling layer. In some implementations, pooling layer 720 may be replaced with a concatenation layer that uses a 2×2 kernel and stride 2 or a 4×4 kernel and stride 4, or some other suitable kernel/stride. In some implementations, pooling layer 720 may be replaced with a convolutional layer with a 2×2 kernel (which may be a filter learned during training) and stride 2, or some other kernel and stride. Pooling layer 720 may feed computed features into a decoder block 730. In some implementations, decoder 730 may have one or more decoder blocks 732-1, 732-2 . . . 732-L whose architecture and operations may be similar to architecture and operations of the decoder blocks described in conjunction with FIG. 4 and FIG. 6B.

In some implementations, at least some of encoder blocks 712-*n* may have skipped connections 724 to at least some of decoder blocks 732-*n*. For example, skipped connections 724 may connect encoder block 712-1 of the highest resolution with decoder block 732-L of the highest resolution, and similarly connect encoder block 712-2 of the second highest resolution with decoder block 732-(L−1) of the second highest resolution, and so on. In some implementations, the number of skipped connections 724 may be less than the number of encoder blocks and/or decoder blocks. The number and placement of skipped connections may be determined empirically.

Pixel classifications 350 may be obtained, e.g., as described in conjunction to pixel classifications 350 of FIG. 4. FIG. 5B depicts an example static element-free FI 502 in which pixels classified as static element pixels (based on processing of FIs 701-1 . . . 701-N by FVSM 700) have been removed.

Figure 8:
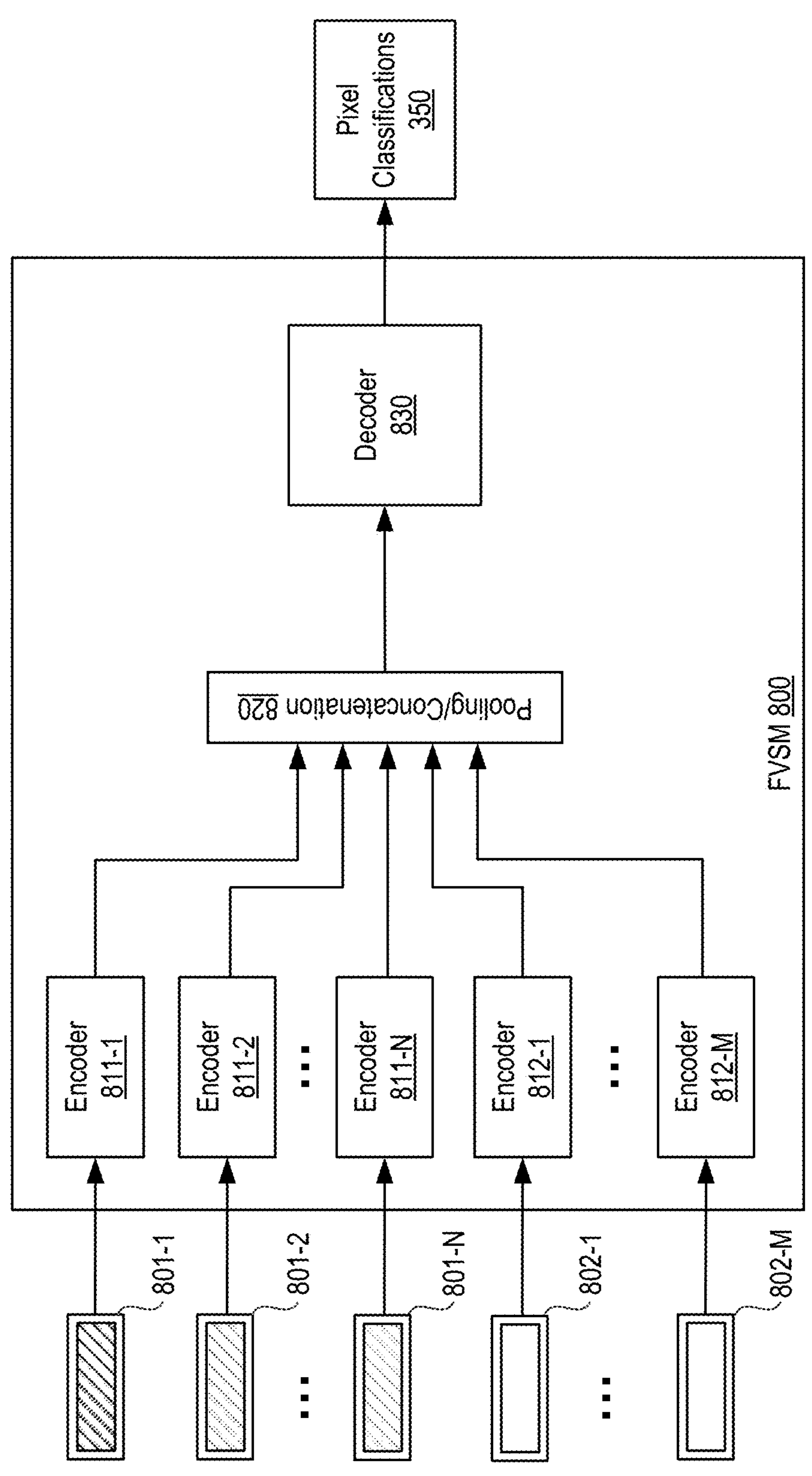
FIG. 8 illustrates an example architecture of a unified field value segmentation model capable of identifying static elements in field images during determination of field values in both fixed-form and flexible-form electronic documents, in accordance with some implementations of the present disclosure.

FIG. 8 illustrates an example architecture of a unified field value segmentation model 800 capable of identifying static elements in field images during determination of field values in both fixed-form and flexible-form electronic documents, in accordance with some implementations of the present disclosure. FVSM 800 may have N+M input channels and may receive, as inputs into the first group of N channels, FIs 801-2 . . . FI 801-N of the field cropped from different documents and populated with different values. FVSM 800 may further receive, as inputs into the second group of M channels, FIs 802-1 . . . FI 802-M of the corresponding empty field cropped from M unfilled forms. Any of the N−1 inputs into the first group of channels and/or any of the M inputs into the second group of channels may be absent (e.g., replaced with zeros or other default inputs), such that at least two inputs are present, e.g., FI 801-1, which represents the target FI whose value is being determined, and at least one additional input, e.g., FI 801-2 or FI 802-1.

In some implementations, FVSM 800 may include N encoders 811-1 . . . 811-N rained to process the first group of input channels and M encoders 812-1 . . . 812-M trained to process the second group of input channels. The features output by the encoders may be pooled (e.g., using a maximum pooling layer or an average pooling layer) at stage 820 and then processed by decoder 830 as described above in conjunction with FIGS. 4-7. In some implementations, pooling at stage 820 may be replaced with a concatenation. Various encoder blocks may have skipped connection (not shown in FIG. 8 for conciseness) with decoder 830 as disclosed above in conjunction with FIG. 4, FIGS. 6A-B, and FIG. 7.

FVSM 800 may be trained using multiple training modes. In one training mode, FVSM 800 may process a training input that includes a single FI of a populated field (e.g., FI 801-1) and a single FI of an empty field (e.g., FI 802-1). In another training mode, FVSM 800 may process a training input that includes a single FI of a populated field (e.g., FI 801-1) and multiple FIs of an empty field (e.g., all or some of FIs 802-1 . . . 802-M). In yet another training mode, FVSM 800 may process a training input that includes multiple FIs of a populated field (e.g., all or some of FIs 801-1 . . . 801-N) and a single FIs of an empty field (e.g., 802-1). In yet another training mode, FVSM 800 may process a training input that includes multiple FIs of a populated field (e.g., all or some of FIs 801-1 . . . 801-N) and multiple FIs of an empty field (e.g., all or some of FIs 802-1 . . . 802-M). Using these different training modes a training engine (e.g., training engine 152) teaches FVSM 800 to perform field value segmentation of a target FI (e.g., FI 801-1) using any combination of one or more additional FIs (filled or unfilled).

Figure 9:
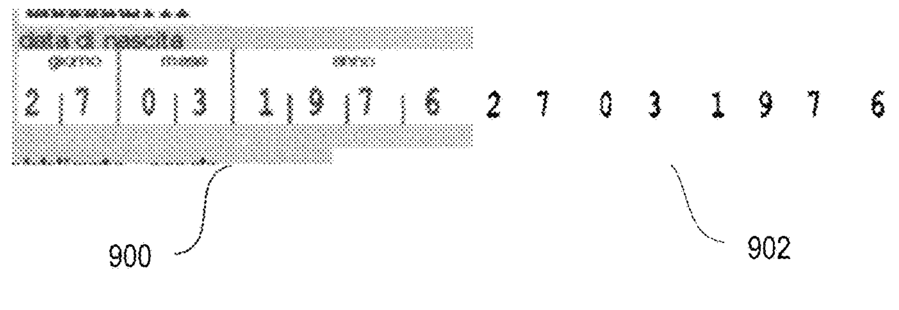
FIG. 9 illustrates example training images that may be used in training of field value segmentation models, in accordance with some implementations of the present disclosure.
Figure 9:
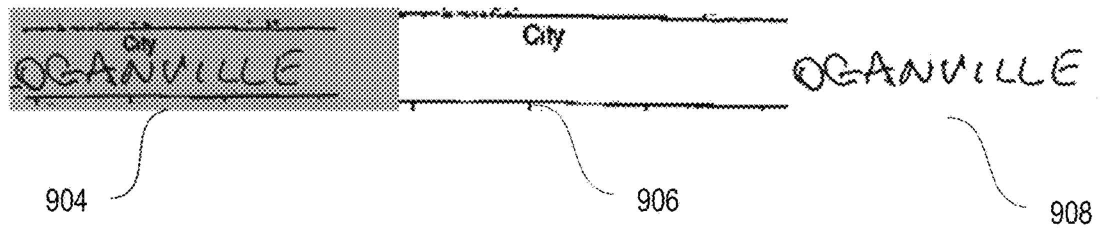
Figure 9:
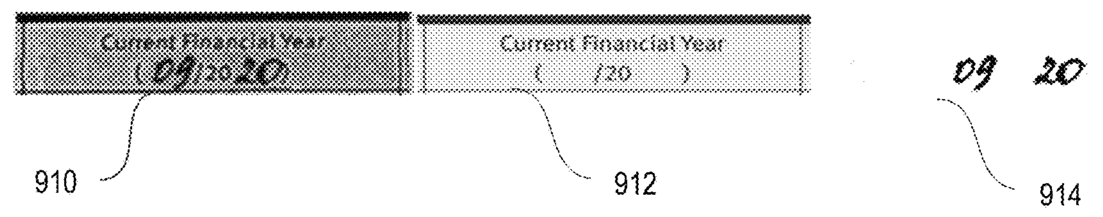
Figure 9:
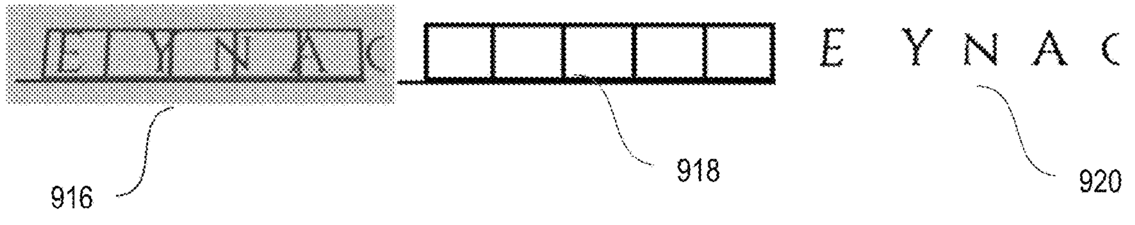
Figure 9:
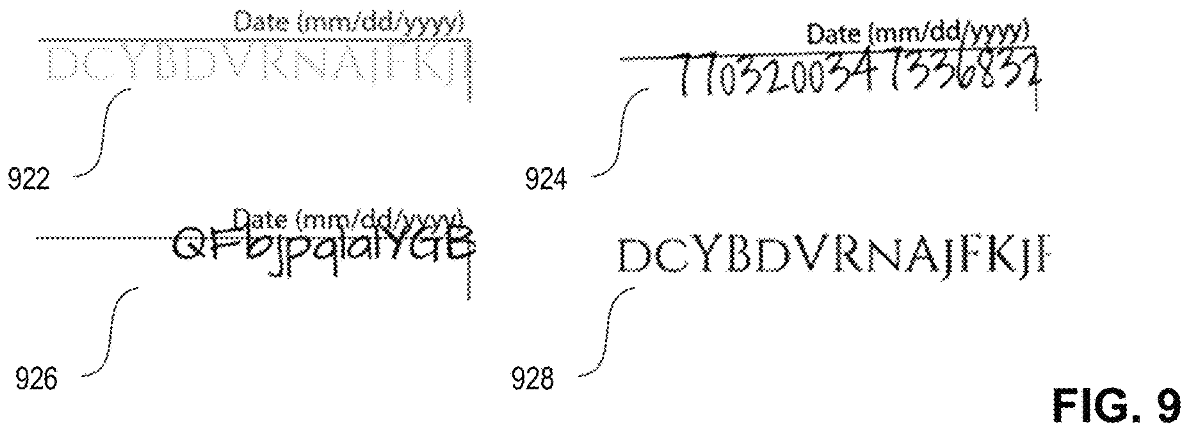

In some implementations, training may be performed using various training FIs that differ in handwriting, typeset, font, size of the written/typed field value, line thickness, noise, overall brightness, background darkness and contrast, deformations, and the like. FIG. 9 illustrates example training images that may be used in training of field value segmentation models, in accordance with some implementations of the present disclosure. In some implementations, at least a subset of training FIs may be prepared with substantial defects, including but not limited to instances where filled values overlap with static elements of the form, e.g., annotations, symbol dividers, outsider borders, and the like.

In some implementations, training FIs may include at least some training FIs that are manually segmented, e.g., image 900 of a populated field and image 902 of the same field in which pixels of the static elements have been manually removed. Image 902 may be used as ground truth during training of FVSMs.

Since manual segmentation of training images may be work-intensive and expensive, training of FVSMs may include using multiple FIs obtained from a single template image. For example, image 904 may be a photographed image of a field and image 906 may be a scanned image of the same field. As illustrated, the images may have different sizes and may be centered differently. An image 908 of the field value with static elements removed may be used as ground truth during training of FVSMs.

To increase the size of the training image set, various synthetic images may be generated and used. For example, image 910 may be a scanned image of a field and image 912 may be a synthetic image (e.g., PDF image) of the corresponding clean field. Image 914 illustrates a training output of a FVSM 400 applied to image 910 and image 912.

Generating synthetic images may include adding various static elements to base images. For example, image 916 may be generated starting from image 918 of an empty field, applying a distortion (e.g., projective transformation in the illustrated example) to the field, adding a background, and value “EYNAC” to the field. The value “EYNAC” may also be used to generate a ground truth image 920 of the synthetic field.

Synthetic images may also be used for training of models (e.g., FVSM 700) that perform field value segmentation without relying on the images of empty fields. For example, synthetic images 922, 924, and 926 of the same field populated with three different values may be used as training inputs for training FVSM 700 with image 928 used as the ground truth.

Training images may be generated using a set of templates of FIs depicting empty (unpopulated) fields. In some implementations, templates of FIs may be cropped from images of target fields from real unfilled documents of interest. In some implementations, templates of FIs may be fully synthetic, e.g., generated by a processing device under a developer control by creating a background coloring, adding lines, symbol dividers/separators, text annotations, and/or any other static elements found in real fields. The elements may have different appearances in different templates. For example, templates of FIs may have different dimensions, thickness of lines, different fonts of annotations, different spacings between symbol dividers, and so on. In some implementations, templates of FIs may be generated using a combined technique, e.g., by cropping base images from real documents and then augmenting base images by modifying existing static elements and/or using any number of additional synthetic elements, as described above.

The set of generated templates may then be used to generate a set of images of fields populated with field values. A field value may be any string of handwritten, typed, drawn, stamped, etc., symbols that may be human-generated or machine-generated. Field values may be in any suitable format, e.g., raster format, pixel format, or any combination thereof. The generated field values may be combined with (e.g., placed over) one of the FI templates to obtain an image of a populated field. Various techniques of image combining may be used, e.g., the Python Image Library, or other resources. Boundary pixels (or other graphical units) of the field values may be blended with adjacent pixels (or other graphical units) of the field template to achieve a more natural look to the synthetic images and to facilitate learning from the overall look of the images rather than from boundary static elements.

In one illustrative non-limiting implementation, 5-10 different template FIs of empty fields may be generated and combined with 100-500 different field values that include various combinations of alphanumeric characters, fonts, sizes, colors, placements, artifacts, and the like. Correspondingly, a training dataset may have 500-5000 different training FIs. Training may be performed in epochs of increasing difficulty. For example, a first epoch may use 1000-2000 training FIs depicting field values that are well-centered and have minimal overlap with the field's static elements. After the model learns how to perform a successful segmentation of the images of the first epoch, e.g., with the number of segmentation errors not exceeding a target value (e.g., 1%, 2%, or any other target value), a second epoch of 1000-2000 training FIs may be used that present more challenging segmentation problems, e.g., strong value-static element overlap, presence of noise, lack of contrast, and the like. In some implementations, additional training images may be generated during training with unique typesets/handwriting, combinations of symbols, unusual placement of the values relative to the fields, and so on. Although fully synthetic FIs may be generated for the training set of images as described above, any combination of synthetic images and images taken from real documents may be used, e.g., a combination of real fields with synthetic values or a combination of synthetic fields with real values. Additionally, the training set may include FIs of real fields populated with real field values.

In some implementations, data used in each epoch may be separated into batches of a certain number of training FIs, e.g., 16, 32, 64 . . . training FIs per batch. In some implementations, training images in a particular batch may be resized (rescaled) to have the same size. In some implementations, training images in a batch may be cropped (without resizing) to the same size. In some implementations, a combination of cropping and resizing may be used to ensure that training FIs in a batch have the same size.

In some implementations, training of the models is performed to maximize the Sørensen-Dice metric m that evaluates the accuracy of classifying various pixels of a given FI as static element pixels or value pixels. For example, the Sørensen-Dice metric m may be computed as $$m = \frac{n_{TP}}{n_{TP} + n_F},$$

where $n_{TP}$ is the number of true positives, e.g., the number of correctly identified field-value pixels, and $n_F$ is the number associated with falsely identified pixels, e.g., a total or an average of the number of false positives $n_{FP}$ (e.g., the number of static element pixels incorrectly identified as field-value pixels) and the number of false negatives $n_{FN}$ (e.g., the number of field-value pixels incorrectly identified as static element pixels), e.g., $$n_F = (n_{FP} + n_{FN})/2.$$

In some implementations, the weighted binary cross-entropy loss function may be used, e.g., in addition to the Sørensen-Dice metric or instead of Sørensen-Dice metric, to evaluate the difference between training outputs and target outputs (ground truth). In some implementations, the loss function may be the weighted dice loss function, the focal loss function, or some other suitable loss function, or a combination thereof. In some implementations, for control of the speed of (gradient descent) training, a training engine may use the Adam Optimizer and the Cosine Scheduler with Warm-Up.

Figure 10:
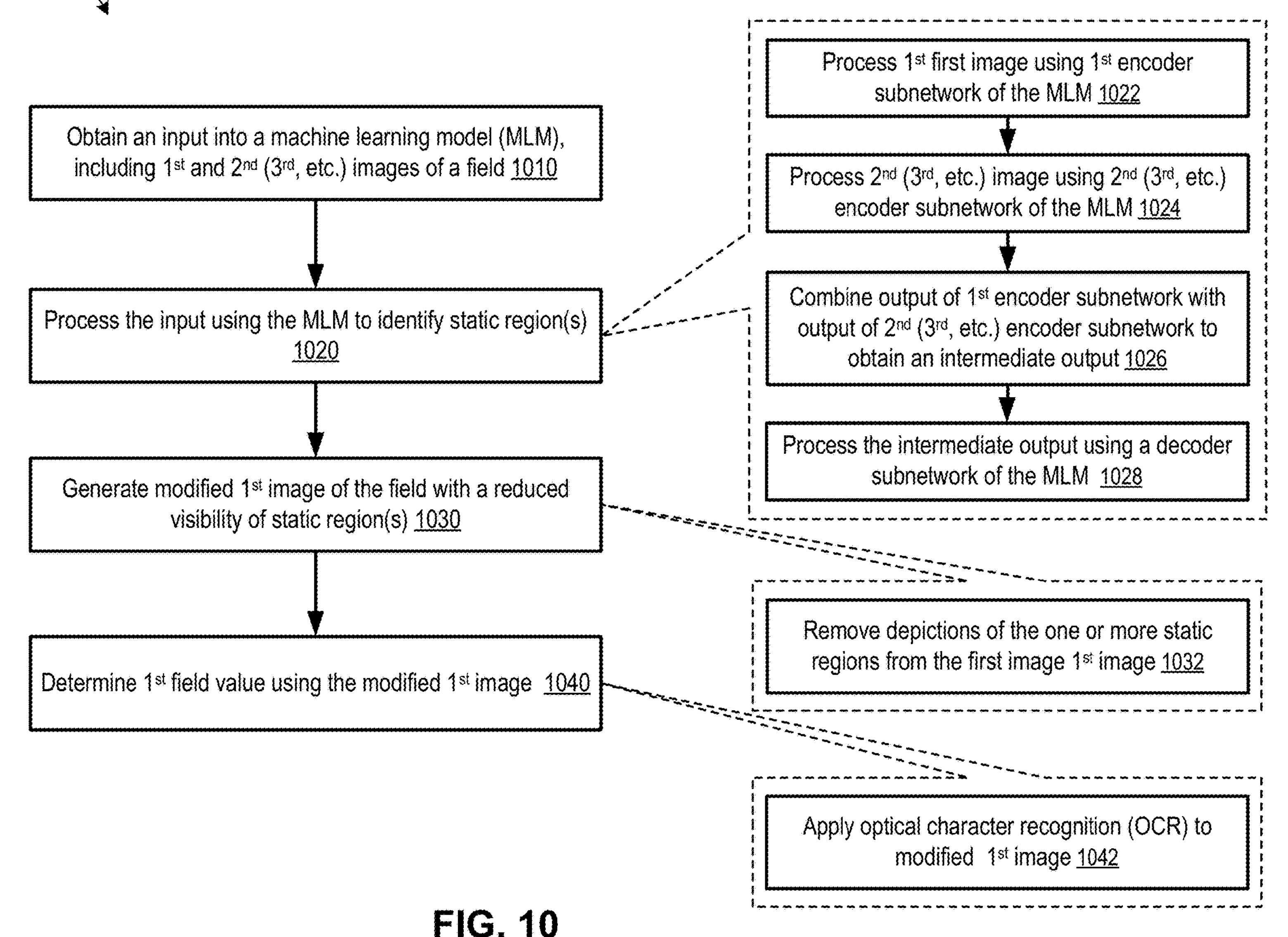
FIG. 10 is a flow diagram illustrating an example method of determination of field values in electronic documents using trained field value segmentation models, in accordance with some implementations of the present disclosure.
Figure 11:
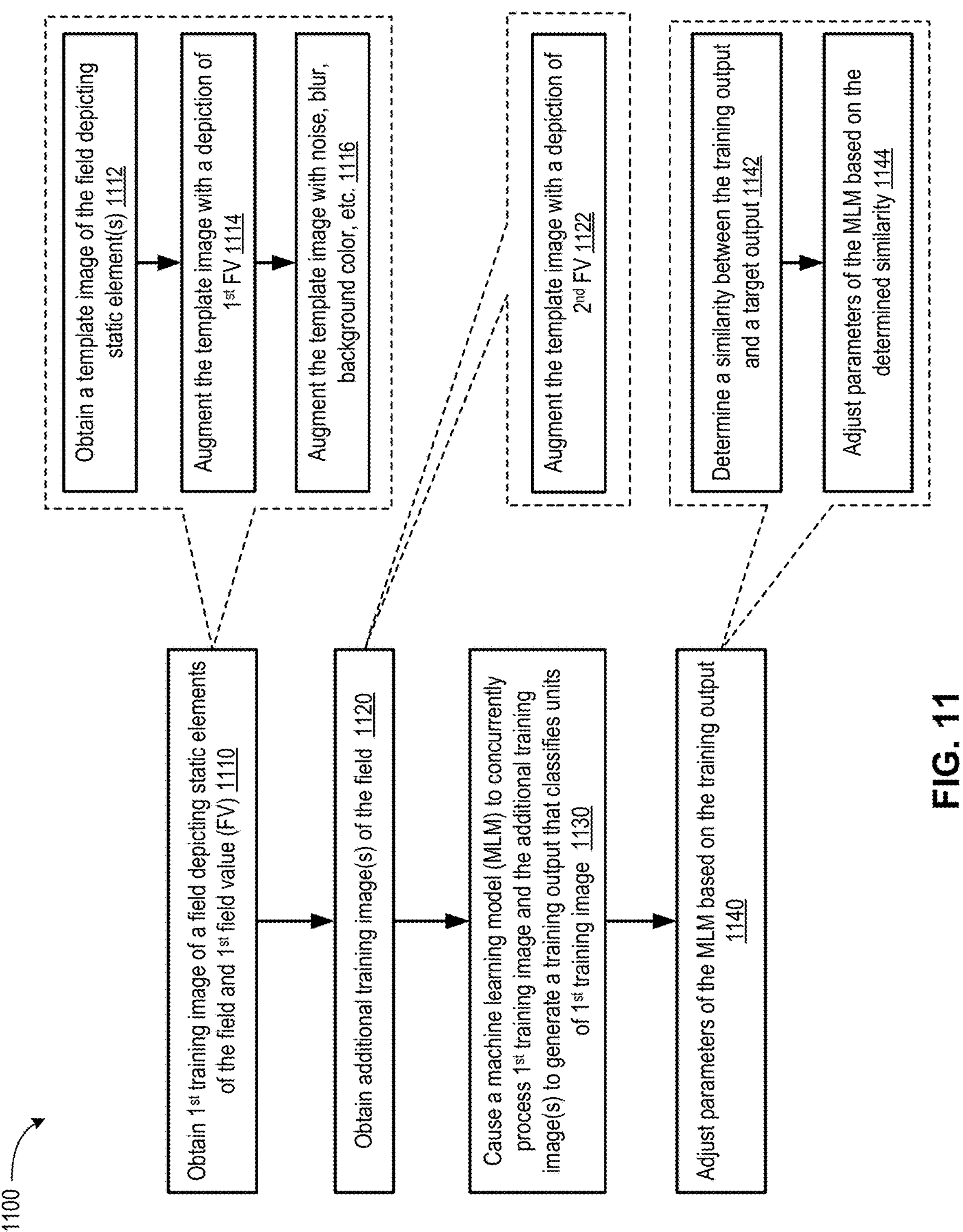
FIG. 11 is a flow diagram illustrating an example method of training of field value segmentation models for reliable determination of field values in electronic documents, in accordance with some implementations of the present disclosure.

FIGS. 10-11 illustrate example methods 1000-1100 that can be used for training and deployment of machine learning models capable of reliable determination of field values, in accordance with some implementations of the present disclosure. A processing device, having one or more processing units (CPUs) and memory devices communicatively coupled to the CPU(s), may perform methods 1000-1100 and/or each of their individual functions, routines, subroutines, or operations. The processing device executing methods 1000-1100 may be a processing device of computing device 110 of FIG. 1. In certain implementations, a single processing thread may perform methods 1000-1100. Alternatively, two or more processing threads may perform methods 1000-1100, each thread executing one or more individual functions, routines, subroutines, or operations of the methods. In an illustrative example, the processing threads implementing methods 1000-1100 may be synchronized (e.g., using semaphores, critical sections, and/or other thread synchronization mechanisms). Alternatively, the processing threads implementing methods 1000-1100 may be executed asynchronously with respect to each other. Various operations of methods 1000-1100 may be performed in a different order compared with the order shown in FIGS. 10-11. Some operations of methods 1000-1100 may be performed concurrently with other operations. Some operations may be optional.

FIG. 10 is a flow diagram illustrating an example method 1000 of determination of field values in electronic documents using trained field value segmentation models, in accordance with some implementations of the present disclosure. At block 1010, a processing device performing method 1000 may obtain an input into an MLM (e.g., FVSM 114 of FIG. 1, FVSM 400 of FIG. 4, FVSM 700 of FIG. 7, and/or FVSM 800 of FIG. 8, and/or other similar models). The input into the MLM may include a first image of a field (e.g., FI 401 of FIG. 4, FI 701-1 of FIG. 7, FI 801-1 of FIG. 8, image 922 of FIG. 9, and the like). The first image may be extracted from a first document (e.g., any document whose field value(s) are being determined). As illustrated in FIG. 5A, the first image may depict one or more static elements of the field, e.g., a line, a symbol divider, a border of the field, a background color of the field, an annotation of the field, or any other elements, and/or any combination thereof. The first image may further depict a first field value (e.g., value "314529" in FIG. 5A), which may include any characters, symbols, and/or graphics elements entered into the first field in any suitable way. The input into the MLM may further include a second image of the field. The second image may similarly depict the static element(s) of the field. It should be understood that the static elements depicted in the second image (e.g., image 912 in FIG. 9) need not be an exact copy of the static elements depicted in the first image (e.g., image 910 in FIG. 9), and may have similar layouts but different dimensions, shading, thickness of lines, sharpness, background, color, and any other elements. In some implementations, the second image may be devoid of a field value (e.g., the second image may be of an empty, unpopulated field), as illustrated with FI 402 in FIG. 4 and/or image 906, image 912, and image 918 in FIG. 9. In some implementations, the second image may depict a second field value, e.g. as illustrated with image 701-2 in FIG. 5B and/or image 924 in FIG. 9, and the like. In some implementations, the second image may be a synthetic image. In some implementations, the second image may be extracted from a second document of the same type, e.g., any other document whose field values are being determined, any training document, any suitable synthetic document, and the like.

In some implementations, the input into the MLM may include one or more additional images (a third image, a fourth image, etc.), e.g., as depicted schematically in FIG. 7 and FIG. 8 and illustrated with image 701-3, 701-4, 701-5 in FIG. 5B and image 926 in FIG. 9. Each (or at least some) of one or more additional images may depict the field extracted from a respective additional document of one or more additional documents and may depict the one or more static elements of the field and a respective additional field value of one or more additional field values (e.g., image 701-3 depicts value "12 12 1963" and image 701-4 depicts value "18 02 1978").

In some implementations, obtaining the input into the MLM may include identifying, in the first document, one or more reference elements associated with the field (e.g., lines, borders, corners, letter/numerals/symbols, and the like). The processing device may further locate, using the one or more reference elements, a portion of the first document corresponding to the first image of the field (e.g., a set of pixels located within a certain vicinity of the reference elements). Method 1000 may further include cropping the located portion to obtain the first image of the field.

At block 1020, method 1000 may continue with processing the obtained input using the MLM to identify one or more static regions. The one or more static regions (e.g., pixels or groups of pixels) may correspond to at least one static element of the field (e.g., a group of pixels corresponding to a border of the field). In some implementations, processing the obtained input may include operations illustrated with the top callout portion in FIG. 10. More specifically, at block 1022, method 1000 may include processing the first image using a first encoder subnetwork of the MLM (e.g., encoder 410-1 of FIG. 4, encoder 710 of FIG. 7, encoder 811-1 of FIG. 8). At block 1024, method 1000 may include processing the second image using a second encoder subnetwork of the MLM (e.g., encoder 410-2 of FIG. 4, encoder 811-2 of FIG. 8). In some implementations, processing of the one or more additional images (e.g., third, fourth, etc., image) may be performed using a respective additional encoder subnetwork (e.g., encoders 811-N, 812-1 . . . 812-M of FIG. 8). In some implementations, the first image, the second image, and the one or more additional images may be processed by a single encoder subnetwork of the MLM (e.g., encoder 710 of FIG. 7).

At block 1026, processing the input may further include combining an output of the first encoder subnetwork with an output of the second encoder subnetwork (e.g., as illustrated in FIG. 4) to obtain an intermediate output. In some implementations, the intermediate output may be obtained by combining an output of the first encoder subnetwork, an output of the second encoder subnetwork, and outputs of the additional encoder subnetworks, e.g., as illustrated in FIG. 4 and/or FIG. 8. At block 1028, the processing device performing method 1000 may process the intermediate output using a decoder subnetwork of the MLM (e.g., decoder 430 of FIG. 4, decoder 730 of FIG. 7, decoder 830 of FIG. 8).

An output of the MLM may include for each of a plurality of regions of the first image, a likelihood of a respective region (e.g., a pixel or a group of pixels) corresponding to at least one of a static-element class (e.g., a pixel corresponding to a border or the field, an annotation of the field) or a field-value class (e.g., a pixel corresponding to a depiction of the field value).

At block 1030, method 1000 may include generating a modified first image of the field. The modified first image may depict at least one of the one or more static regions with a reduced visibility (e.g., lower intensity) compared with the first image. For example, as illustrated with block 1032 in the middle callout portion of FIG. 10, generating the modified first image of the field may include removing depictions of the one or more static regions from the first image, e.g., setting the intensity of pixels of the image classified as static-element pixels to zero or to any other default intensity (e.g., that of a background).

At block 1040, method 1000 may include determining the first field value using the modified first image. For example, as illustrated with block 1042 in the bottom callout portion of FIG. 10, determining the first field value may include applying an optical character recognition (OCR) algorithm to the modified first image.

FIG. 11 is a flow diagram illustrating an example method 1100 of training of field value segmentation models for reliable determination of field values in electronic documents, in accordance with some implementations of the present disclosure. At block 1110, a processing device performing method 1100 may obtain a first training image of a field. The first training image may depict one or more static elements of the field and a first field value, e.g., image 900 of FIG. 9 depicts the value "27 03 1976" and various static elements, such as background shading, annotations separation lines, and so on. In some implementations, as illustrated with the top callout portion in FIG. 11, obtaining the first training image may include a number of operations. More specifically, at block 1112, method 1100 may include obtaining a template image of the field. The template image may depict the one or more static elements of the field (e.g., as illustrated with FI 402 in FIG. 4 and/or image 906, image 912, and image 918 in FIG. 9). At block 1114, method 1100 may include augmenting the template image with a depiction of the first field value. At block 1116, method 1100 may include augmenting the template image with at least one of a noise, a blur, or a background color. For example, a template image 918 of FIG. 9 may be augmented with a depiction of the field value "EYNAC" and further augmented with a grey background color to obtain image 916.

At block 1120, method 1100 may continue with obtaining one or more additional training images of the field. In some implementations, the one or more additional training images of the field may include the template image. In some implementations, each (or at least some) of the one or more additional training images of the field may depict the one or more static elements of the field, and may further include a respective one of one or more additional field values. In some implementations, as illustrated with the middle callout portion in FIG. 11, obtaining second (third, etc.) additional training image may include augmenting the template image with a depiction of a second (third, etc.) field value (which may be performed similarly to operations of block 1114). The additional training image may further be augmented with noise, blur, background color (e.g., as described in conjunction with block 1112).

At block 1130, method 1100 may include causing the MLM to concurrently process the first training image and the one or more additional training images to generate a training output that classifies at least some of a plurality of units (e.g., pixels or groups of pixels of the first training image) among various classes. For example, a unit of the first training image may be classified as a unit associated with the one or more static elements of the field. A unit of the first training image may be classified with a unit associated with the field value.

At block 1140, method 1100 may include adjusting parameters of the MLM based on the training output. In some implementations, as illustrated with the bottom callout portion in FIG. 11, adjusting parameters of the MLM may include, as shown with block 1142, determining, using a loss function, a similarity between the training output and a target output (e.g., image 920 of FIG. 9). In some implementations, the target output may identify a subset of units (of the plurality of units of the corresponding training image) associated with the first field value. At block 1144, method 1100 may include adjusting parameters of the MLM based on the determined similarity. For example, weights and biases of the MLM may be adjusted to increase the similarity between the training output and the target output.

Figure 12:
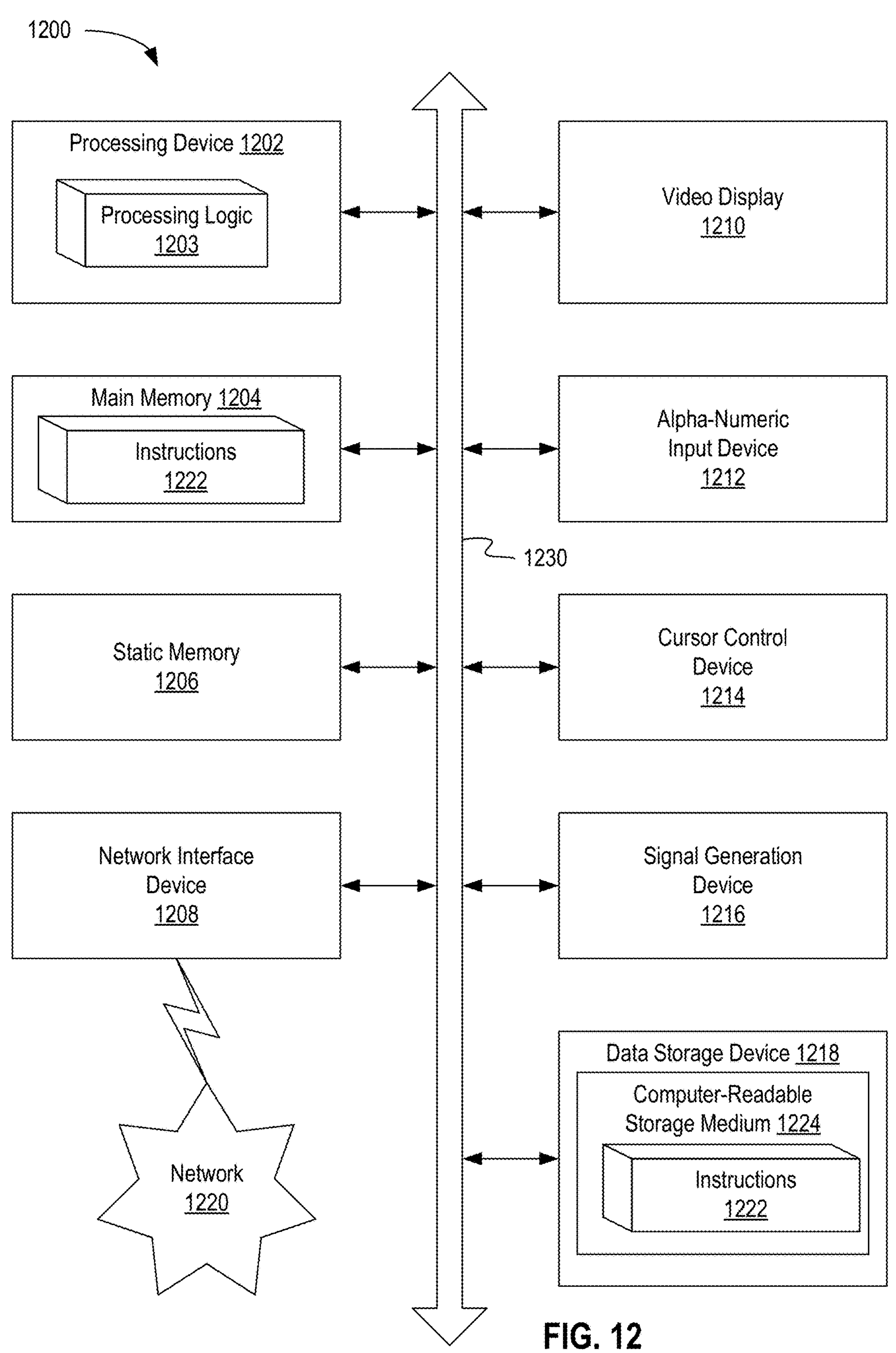
FIG. 12 depicts an example computer system that can perform any one or more of the methods described herein, in accordance with some implementations of the present disclosure.

FIG. 12 depicts an example computer system 1200 that can perform any one or more of the methods described herein, in accordance with some implementations of the present disclosure. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1200 includes a processing device 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1218, which communicate with each other via a bus 1230.

Processing device 1202 (which can include processing logic 1203) represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like. The processing device 1202 is configured to execute instructions 1222 for implementing field localization engine 112, FVSM 114, OCR module 116, training engine 152, and/or augmentation engine 154 of FIG. 1 and to perform the operations discussed herein (e.g., methods 1000-1100 of FIGS. 10-11).

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). In one illustrative example, the video display unit 1210, the alphanumeric input device 1212, and the cursor control device 1214 may be combined into a single component or device (e.g., an LCD touch screen).

The data storage device 1218 may include a computer-readable storage medium 1224 on which is stored the instructions 1222 embodying any one or more of the methodologies or functions described herein. The instructions 1222 may also reside, completely or at least partially, within the main memory 1204 and/or within the processing device 1202 during execution thereof by the computer system 1200, the main memory 1204 and the processing device 1202 also constituting computer-readable media. In some implementations, the instructions 1222 may further be transmitted or received over a network 1220 via the network interface device 1208.

While the computer-readable storage medium 1224 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:
- obtaining an input into a machine learning model (MLM), wherein the input comprises:
  - a first image of a field, wherein the first image is extracted from a first document and depicts one or more static elements of the field and a first field value, and
  - a second image of the field;
- processing the input using the MLM to identify one or more static regions, wherein each of the one or more static regions corresponds to at least one of the one or more static elements of the field;
- generating a modified first image of the field, wherein the modified first image depicts at least one of the one or more static regions with a reduced visibility compared with the first image; and
- determining the first field value using the modified first image.

2. The method of claim 1, wherein the second image is devoid of a field value and depicts the one or more static elements of the field, and wherein the second image is a synthetic image or an image extracted from a second document.

3. The method of claim 1, wherein processing the input comprises:
- processing the first image using a first encoder subnetwork of the MLM; and
- processing the second image using a second encoder subnetwork of the MLM.

4. The method of claim 3, wherein processing the input further comprises:

combining an output of the first encoder subnetwork with an output of the second encoder subnetwork to obtain an intermediate output; and processing the intermediate output using a decoder subnetwork of the MLM.

5. The method of claim 1, wherein the second image depicts the one or more static elements of the field and a second field value, and wherein the second image is extracted from a second document.

6. The method of claim 5, wherein the input comprises one or more additional images, wherein each of one or more additional images depicts the field extracted from a respective additional document of one or more additional documents and depicts the one or more static elements of the field and a respective additional field value of one or more additional field values, and wherein processing the input comprises:

processing the first image using a first encoder subnetwork of the MLM;

processing the second image using a second encoder subnetwork of the MLM;

processing each of the one or more additional images using a respective additional encoder subnetwork of one or more additional encoder subnetworks of the MLM;

combining an output of the first encoder subnetwork, an output of the second encoder subnetwork, and an output of each of one or more additional encoder subnetworks to obtain an intermediate output; and processing the intermediate output using a decoder subnetwork of the MLM.

7. The method of claim 1, wherein an output of the MLM comprises, for each of a plurality of regions of the first image, a likelihood of a respective region corresponding to at least one of a static-element class or a field-value class.

8. The method of claim 1, wherein generating the modified first image of the field comprises removing depictions of the one or more static regions from the first image.

9. The method of claim 1, wherein obtaining the input comprises:

identifying, in the first document, one or more reference elements associated with the field;

locating, using the one or more reference elements, a portion of the first document corresponding to the first image of the field; and cropping the located portion to obtain the first image of the field.

10. The method of claim 1, wherein determining the first field value comprises applying an optical character recognition (OCR) algorithm to the modified first image.

11. The method of claim 1, wherein the one or more static elements of the field comprise at least one of a line, a symbol divider, a border of the field, a background color of the field, or an annotation of the field.

12. A method of training a machine learning model (MLM), the method comprising:

obtaining a first training image of a field, wherein the first training image depicts one or more static elements of the field and a first field value;

obtaining one or more additional training images of the field;

causing the MLM to concurrently process the first training image and the one or more additional training images to generate a training output that classifies at least some of a plurality of units of the first training image as one of at least:

a unit associated with the one or more static elements of the field, or a unit associated with the first field value;

adjusting parameters of the MLM based on the training output; and causing the trained MLM to be deployed to determine one or more field values in at least one additional document.

13. The method of claim 12, wherein obtaining the first training image comprises:

obtaining a template image of the field, wherein the template image depicts the one or more static elements of the field; and augmenting the template image with a depiction of the first field value.

14. The method of claim 13, wherein obtaining the first training image further comprises:

augmenting the template image with at least one of a noise, a blur, or a background color.

15. The method of claim 13, wherein the one or more additional training images of the field comprise the template image.

16. The method of claim 13, wherein obtaining one of the one or more additional training images comprises augmenting the template image with a depiction of a second field value.

17. The method of claim 12, wherein each of the one or more additional training images of the field depicts the one or more static elements of the field and a respective one of one or more additional field values.

18. The method of claim 12, wherein adjusting parameters of the MLM comprises:

determining, using a loss function, a similarity between the training output and a target output, wherein the target output identifies a subset of units of the plurality of units of the first training image, wherein the subset of units is associated with the first field value; and adjusting parameters of the MLM based on the determined similarity.

19. The method of claim 12, wherein the one or more static elements of the field comprise at least one of a line, a symbol divider, a border of the field, a background color of the field, or an annotation of the field.

20. A system comprising:

a memory; and a processing device communicatively coupled to the memory, the processing device to:

obtain an input into a machine learning model (MLM), wherein the input comprises:

a first image of a field, wherein the first image is extracted from a first document and depicts one or more static elements of the field and a first field value, and a second image of the field;

process the input using the MLM to identify one or more static regions, wherein each of the one or more static regions corresponds to at least one of the one or more static elements of the field;

generate a modified first image of the field, wherein the modified first image depicts at least one of the one or more static regions with a reduced visibility compared with the first image; and determine the first field value using the modified first image.

* * * * *